United States Patent
Saxena et al.

(10) Patent No.: US 11,741,804 B1
(45) Date of Patent: Aug. 29, 2023

(54) REDUNDANT VIDEO STORAGE AMONG NETWORKED VIDEO CAMERAS

(71) Applicant: Western Digital Technologies, Inc., San Jose, CA (US)

(72) Inventors: Vishwas Saxena, Bangalore (IN); Mukesh Kumar P, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/852,707

(22) Filed: Jun. 29, 2022

(51) Int. Cl.
*H04N 7/18* (2006.01)
*G08B 13/196* (2006.01)

(52) U.S. Cl.
CPC . *G08B 13/19665* (2013.01); *G08B 13/19671* (2013.01); *H04N 7/181* (2013.01)

(58) Field of Classification Search
USPC .......................................................... 348/159
See application file for complete search history.

(56) References Cited

U.S. PATENT DOCUMENTS

| | | | |
|---|---|---|---|
| 8,521,955 B2 | 8/2013 | Arulambalam et al. | |
| 10,009,575 B1 | 6/2018 | Liu et al. | |
| 2004/0126100 A1 | 7/2004 | Ito et al. | |
| 2019/0230324 A1* | 7/2019 | Chien | F21K 9/232 |
| 2019/0253670 A1* | 8/2019 | Chien | F21K 9/233 |
| 2019/0259560 A1* | 8/2019 | Chang | H01J 37/05 |
| 2022/0417473 A1 | 12/2022 | Davidson et al. | |

* cited by examiner

*Primary Examiner* — Nigar Chowdhury
(74) *Attorney, Agent, or Firm* — Patent Law Works, LLP

(57) ABSTRACT

Systems and methods for redundant storage among networked video cameras are described. Video data for a group of video cameras in a backup cluster determined from a network topology is received by a peer video camera. A backup order of the backup cluster is received. The peer video camera sends its source video data for to a backup storage device located at a target peer video camera of the group of video cameras according to the backup order.

20 Claims, 11 Drawing Sheets

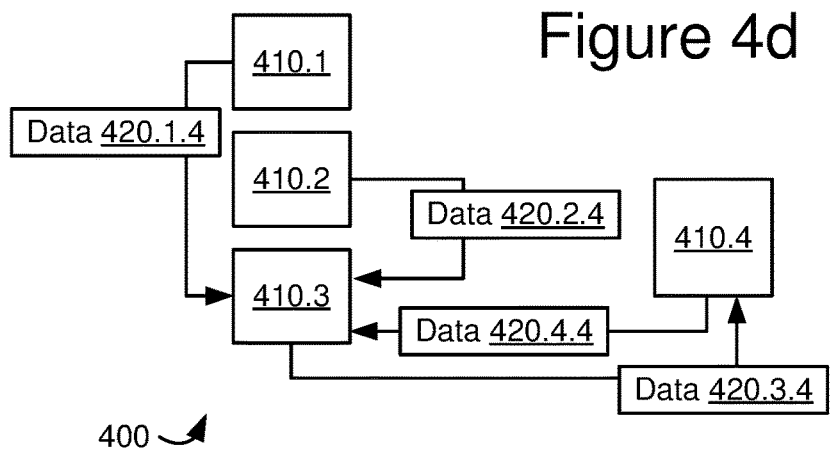
Figure 4d
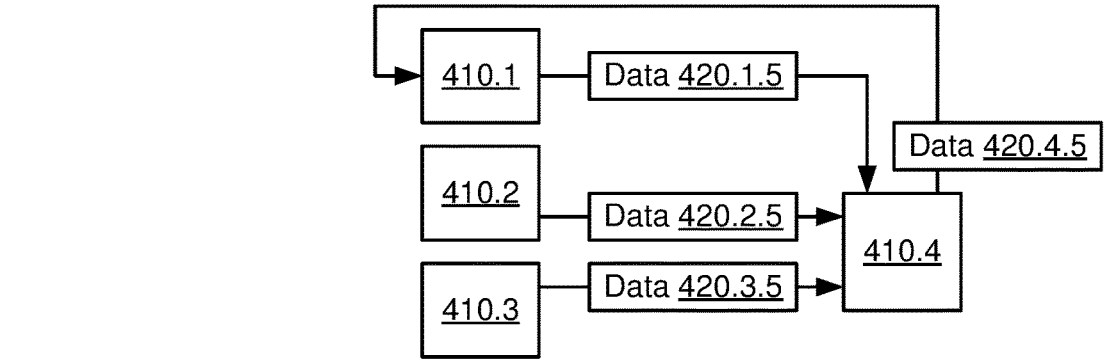
Figure 4e
| Day | Source | | Destination | | Storage (GB) | | | |
|---|---|---|---|---|---|---|---|---|
| | | | | | 1 | 2 | 3 | 4 |
| 1 | 1, 2, 3 | 4 | 4 | 1 | 1 | 0 | 0 | 3 |
| 2 | 2, 3, 4 | 1 | 1 | 2 | 4 | 1 | 0 | 3 |
| 3 | 3, 4, 1 | 2 | 2 | 3 | 4 | 4 | 1 | 3 |
| 4 | 4, 1, 2 | 3 | 3 | 4 | 4 | 4 | 4 | 4 |
| N | 1   2   3   4 | | 2   3   4   1 | | N | N | N | N |
Figure 4f

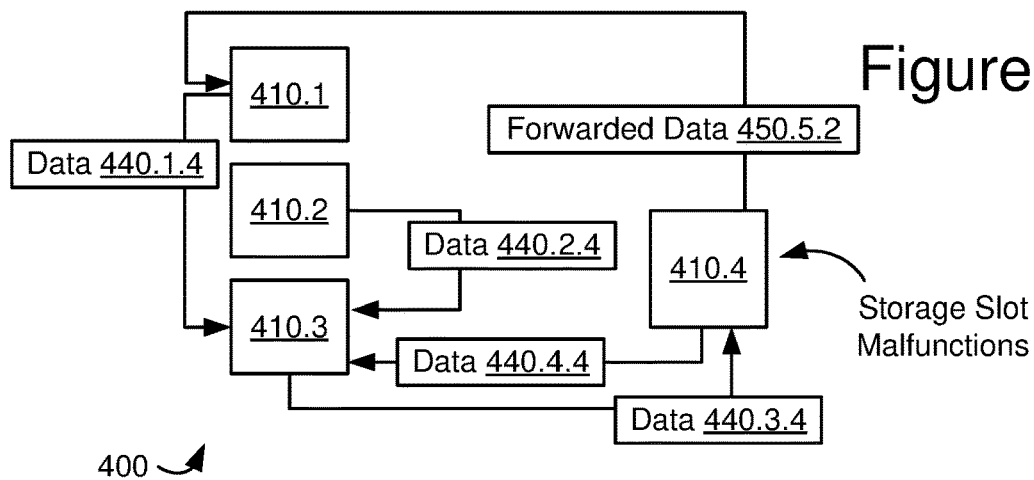
Figure 4j
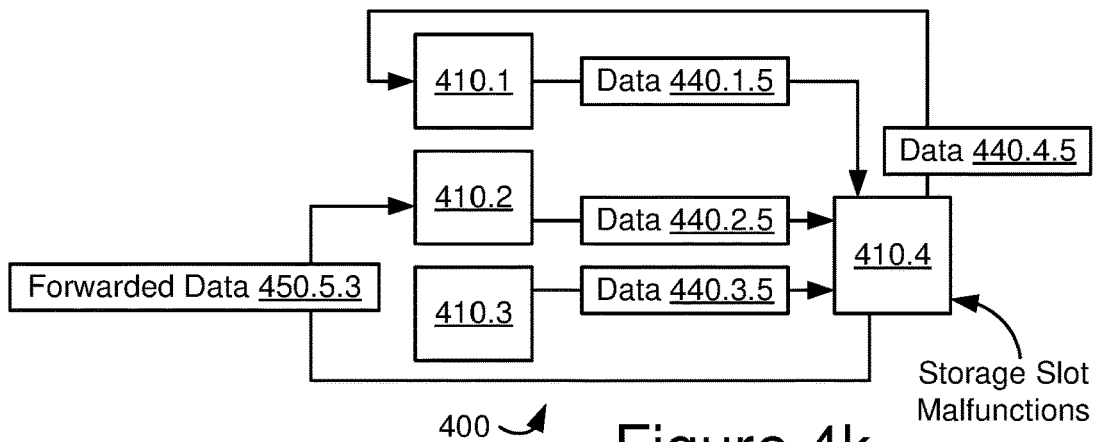
Figure 4k
| Day | Source | Destination | | Storage (GB) | | | |
|---|---|---|---|---|---|---|---|
| | | | | 1 | 2 | 3 | 4 |
| 1 | 1, 2, 3 | 4 | 4 → 1 | 4 | 0 | 0 | 0 |
| 2 | 2, 3, 4 | 1 | 1 | 7 | 1 | 0 | 0 |
| 3 | 3, 4, 1 | 2 | 2 | 7 | 4 | 1 | 0 |
| 4 | 4, 1, 2 | 3 | 3 | 4->1 | 8 | 4 | 4 | 0 |
| 5 | 1, 2, 3 | 4 | 4 → 2 | 1 | 9 | 7 | 4 | 0 |
| 6 | 2, 3, 4 | 1 | 1 | 2 | 12 | 8 | 4 | 0 |
| 7 | 3, 4, 1 | 2 | 2 | 3 | 12 | 11 | 5 | 0 |
| 8 | 4, 1, 2 | 3 | 3 | 4→2 | 12 | 12 | 8 | 0 |
| 12 | 4, 1, 2 | 3 | 3 | 4→3 | 16 | 16 | 16 | |
Figure 4l

REDUNDANT VIDEO STORAGE AMONG NETWORKED VIDEO CAMERAS

TECHNICAL FIELD

The present disclosure generally relates to video surveillance systems and, more particularly, to fault-tolerant redundant storage of video data in camera non-volatile memory.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. Client or user systems are communicatively connected to the server system to request, receive, and display streams of recorded video data and/or related alerts and analytics.

An increasing number of video surveillance systems are using smart video cameras or otherwise moving compute and storage resources to edge devices in the system, rather than relying solely on a network video recorder appliance or cloud-based processing. For example, some video cameras may be configured with processors, memory, and storage resources far exceeding those needed to convert signals from video image and/or audio sensors into a desired video format for transmission to the network video recorder. However, even these increased compute resources may be limited by space, cost, and other considerations and are unlikely to match the compute resources available in a network video recorder, let alone cloud-based video processing servers.

Similarly, in camera storage, such as secure digital (SD) cards, may increase the potential for data loss due to data storage device failure, camera failure, and/or cameras being damaged or stolen. It may be advantageous to provide redundant in-camera storage of video data in a network-based surveillance system. However, simply increasing in-camera storage for daisy chain data replication, besides doubling the storage requirements of each video camera, introduces a single point of failure.

Systems and methods for selectively using fault tolerant redundant video storage among a group of networked video cameras may be advantageous. A reliable and efficient way of calculating and storing data backups to allow recovery of in-camera video data, particularly in edge video surveillance devices, may be needed.

SUMMARY

Various aspects for redundant video storage among a group of networked video cameras are described.

One general aspect includes a system including a first video camera that includes: at least one image sensor configured to capture video images; a network interface configured for communication with a first plurality of peer video cameras over a network, wherein at least one backup cluster of the first plurality of peer video cameras is based on a network topology of the network; a non-volatile memory configured to store source video data captured by the at least one image sensor; and a controller. The controller is configured to: receive peer video data from the first plurality of peer video cameras; receive a backup order of the first plurality of peer video cameras based on an associated backup cluster of the at least one backup cluster; and send the source video data to a backup storage device located at a target peer video camera of the first plurality of peer video cameras according to the backup order.

Implementations may include one or more of the following features. The system may include the first plurality of peer video cameras and a second plurality of video cameras, where: the first plurality of peer video cameras and the first video camera may comprise the associated backup cluster; the second plurality of video cameras may include a second backup cluster configured for communication over the network; and, responsive to a failure of the first video camera, the associated backup cluster is configured to send, to a target video camera among the second plurality of video cameras, backup data from the associated backup cluster may include at least one of the source video data for the first video camera or the received peer video data for the first plurality of peer video cameras. Responsive to the failure of the first video camera, the target video camera replaces the first video camera in the backup order and the associated backup cluster may be further configured to: modify the backup order of the first plurality of peer video cameras in the associated backup cluster to include the target video camera; establish secure network communication with a video storage server; and send a request to the video storage server to remove the target video camera from the second backup cluster. The controller of the first video camera may be further configured to: establish secure network communication with a video storage server; and send, to the video storage server, log data of the received peer video data and backup state data about the source video data for the first video camera sent to the backup storage device located at the target peer video camera of the first plurality of peer video cameras according to the backup order. The system may include the first plurality of peer video cameras, where the peer video data includes a video stream from each peer video camera of the first plurality of peer video cameras; each peer video camera of the first plurality of peer video cameras is configured to send, responsive to a synchronization event, the video stream data generated during a data collection time window; the controller of the first video camera is further configured to determine a maximum capacity for the peer video data generated during the data collection time window; and the maximum capacity is determined based on a storage capacity of the backup storage device. The controller may be further configured to determine the data collection time window based on a predetermined data retention policy. The controller of the first video camera may be further configured to: receive a listing of camera identifiers of the first plurality of peer video cameras in a backup cluster from a server; and determine, based on the listing, the backup storage device on the target peer video camera based on the order of the listing of camera identifiers in the backup cluster. The controller of the first video camera is further configured to: determine a failed data retrieval event at the first video camera; and initiate data recovery associated with the failed data retrieval event based on a backup state log. The first plurality of peer video cameras and the first video camera may include a camera group; each video camera in the camera group may be configured to determine a backup target camera from the camera group based on the backup order and send, to the backup target camera, captured video data by that video camera; and the backup order may include a sequential order of a plurality of unique identifiers, each unique identifier of the plurality of unique identifiers associated with each video camera in the camera group. A notification of failure to store the captured video data may be received from the backup target camera; and each video camera in the camera group may be further configured to send, to a next camera after the backup target camera, the captured video data by that video camera, the next camera defined by the backup order.

Another general aspect includes a computer-implemented method. The computer-implemented method also includes generating, by a first video camera, source video data; storing, by the first video camera, the source video data in a non-volatile memory of the first video camera; receiving, by the first video camera over a network, peer video data from a first plurality of peer video cameras in a first backup cluster, where at least one backup cluster of the first plurality of peer video cameras is based on a network topology of the network; storing, by the first video camera, the peer video data at a local storage device at the first video camera; determining, based on a backup order of the first plurality of peer video cameras and the first video camera, a backup storage device located at a target peer video camera of the first plurality of peer video cameras; and sending, by the first video camera, the source video data in the non-volatile memory of the first video camera to the backup storage device located at the target peer video camera of the first plurality of peer video cameras according to the backup order.

Implementations may include one or more of the following features. The computer-implemented method may include: based on the first video camera failing, sending, to a target video camera among a second plurality of video cameras, backup data from the first backup cluster including at least one of source video data for the first video camera or the received peer video data for the first plurality of peer video cameras; where the first plurality of peer video cameras and the first video camera may comprise the first backup cluster and the second plurality of video cameras may include a second backup cluster configured for communication over the network. The computer-implemented method may include: modifying the backup order of the first plurality of peer video cameras in the first backup cluster to include the target video camera, where the target video camera replaces the first video camera in the backup order; establishing secure network communication with a video storage server; and sending a request to the video storage server to remove the target video camera from the second backup cluster. The computer-implemented method may include: establishing secure network communication with a video storage server; and sending, to the video storage server, log data of the received peer video data and backup state data about the source video data for the first video camera sent to the backup storage device located at the target peer video camera of the plurality of peer video cameras according to the backup order. A maximum capacity for the peer video generated during a data collection time window is determined based on a predetermined data retention policy and a storage capacity of the backup storage device. The computer-implemented method may include: receiving a listing of camera identifiers of the first plurality of peer video cameras in a backup cluster from a server; and determining, based on the listing, the backup storage device on the target peer video camera based on the order of the listing of camera identifiers in the backup cluster. The computer-implemented method may include storing, by the first video camera, metadata about the received peer video data in a backup state log, where the metadata describes at least a size of the received peer video data and a camera identifier of a source peer video camera of the first plurality of peer video cameras. The computer-implemented method may include: determining a failed data retrieval event at the first video camera; and initiating data recovery associated with the failed data retrieval event based on the backup state log. The computer-implemented method, where first plurality of peer video cameras and the first video camera may comprise a camera group, may further include, for each video camera in the camera group: determining a backup target camera from the camera group based on the backup order; sending, to the backup target camera, captured video data by that video camera; and the backup order may include a sequential order of a plurality of unique identifiers, each unique identifier of the plurality of unique identifiers associated with each video camera in the camera group.

Still another general aspect includes a video camera including: at least one image sensor configured to capture video images; a network interface configured for communication with a plurality of peer video cameras over a network, where at least one backup cluster of the plurality of peer video cameras is determined from a network topology based on the network; a non-volatile memory configured to store source video data captured by the at least one image sensor; means for receiving, over the network, peer video data from the plurality of peer video cameras; means for storing the peer video data; means for determining, based on a backup order of the plurality of peer video cameras and the video camera, a backup storage device located at a target peer video camera of the plurality of peer video cameras; and means for sending the source video data to the backup storage device located at the target peer video camera of the plurality of peer video cameras according to the backup order.

The various embodiments advantageously apply the teachings of computer-based video surveillance systems to improve the functionality of such computer systems. The various embodiments include operations to overcome or at least reduce the issues previously encountered in surveillance systems and, accordingly, are more reliable and/or cost-efficient than other surveillance systems. That is, the various embodiments disclosed herein include hardware and/or software with functionality to improve redundant on-camera storage of video data for a group of video cameras supporting remote access, such as through a video surveillance as a service (VSaaS) server and/or end user video surveillance application without requiring mass video data transfer and storage off camera. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

BRIEF DESCRIPTION OF THE DRAWINGS

FIG. 4d schematically illustrates an example fault-tolerant redundant storage scheme for a video data unit stored by the computer-based surveillance system of FIG. 1.

FIG. 4e schematically illustrates an example fault-tolerant redundant storage scheme for a video data unit stored by the computer-based surveillance system of FIG. 1.

FIG. 4f schematically illustrates an example representation of data in a fault-tolerant redundant storage scheme for a video data unit stored by the computer-based surveillance system of FIG. 1.

FIG. 4j schematically illustrates an example fault-tolerant redundant storage scheme for a video data unit stored by the computer-based surveillance system of FIG. 1.

FIG. 4k schematically illustrates an example fault-tolerant redundant storage scheme for a video data unit stored by the computer-based surveillance system of FIG. 1.

FIG. 4l schematically illustrates an example representation of data in a fault-tolerant redundant storage scheme for a video data unit stored by the computer-based surveillance system of FIG. 1.

DETAILED DESCRIPTION

Figure 1:
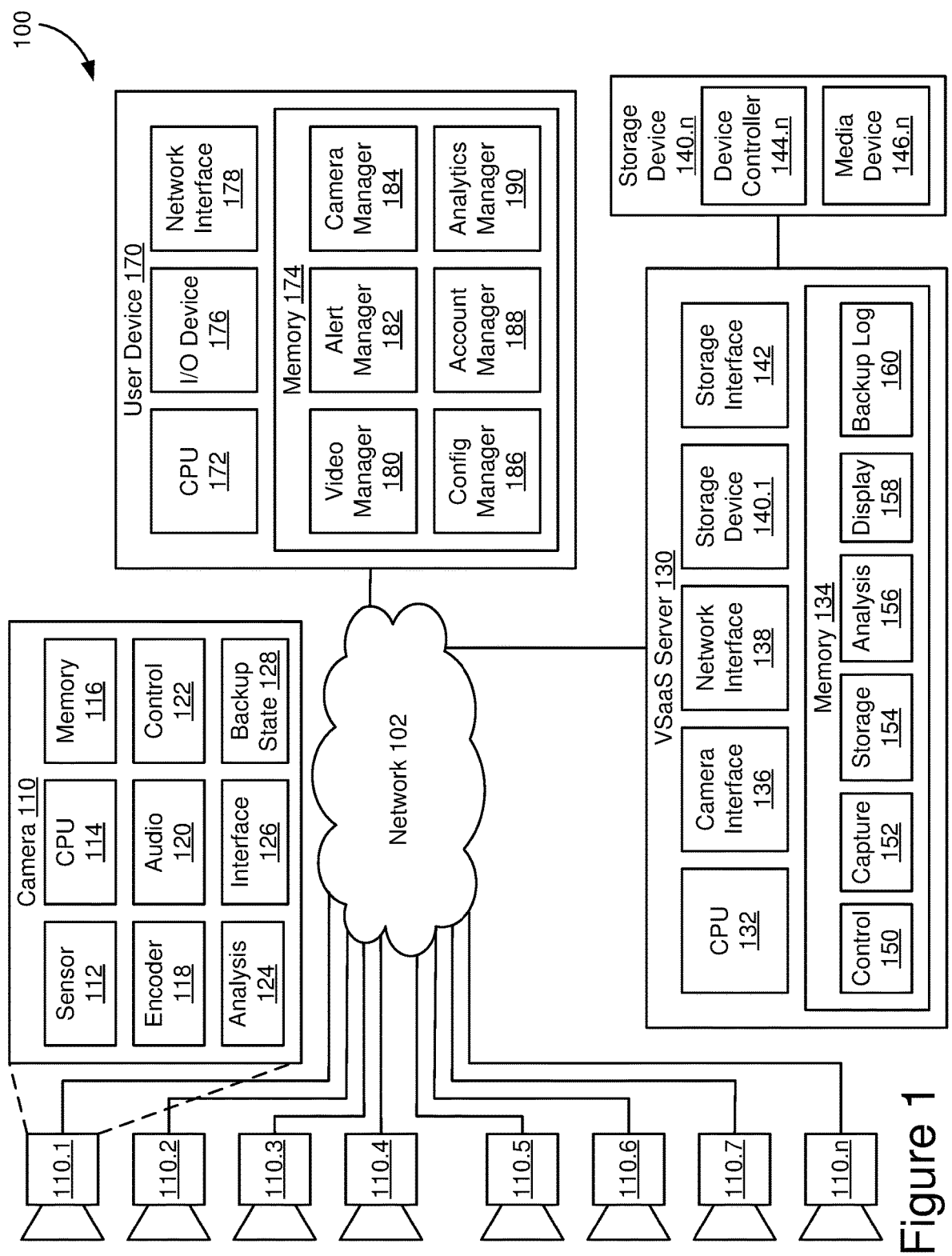
FIG. 1 schematically illustrates a computer-based surveillance system.

FIG. 1 shows an embodiment of an example video surveillance system 100 with multiple video cameras 110 interconnected to a video surveillance as a service (VSaaS) server 130 for display of surveillance video on user device 170. While some example features are illustrated, various other features have not been illustrated for the sake of brevity and so as not to obscure pertinent aspects of the example embodiments disclosed herein. In some embodiments, cameras 110, VSaas server 130, and user device 170 are computer-based components that may be interconnected by a network 102.

In some embodiments, one or more networks 102 may be used to communicatively interconnect various components of surveillance system 100. For example, each component, such as cameras 110, VSaas server 130, network storage device 140.n, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and VSaas server 130, enabling VSaas server 130 to control access to cameras 110 and their video data.

Cameras 110 may include analog or digital cameras connected to an encoder that generates an encoded video stream of time-dependent video frames with a defined resolution, aspect ratio, and video encoding format. In some embodiments, cameras 110 may include internet protocol (IP) cameras configured to encode their respective video streams and stream them over network 102 to VSaaS server 130. In some embodiments, cameras 110 may be configured to receive audio data through integrated or connected microphones (not shown) and include embedded and/or synchronized audio streams with their respective video streams. In some embodiments, video cameras 110 may include an image sensor 112, a processor (central processing unit (CPU), a neural processing unit, a vision processing unit, etc.) 114, a memory 116, an encoder 118, an audio channel 120, a control circuit 122, and/or a network interface 126. In some embodiments, video cameras 110 may include onboard analytics, such as a video analysis subsystem 124.

In some embodiments, the components of camera 110 may be configured in one or more processing systems or subsystems and/or printed circuit boards, chips, busses, etc. that are disposed or enclosed in a video camera housing. For example, image sensor 112, processor 114, memory 116, encoder 118, audio channel 120, control circuit 122, analysis subsystem 124, a network interface 126, and/or a backup state module 128 may comprise one or more application-specific integrated circuits (ASICs) mounted within a sealed plastic, metal, or similar housing with an aperture (often integrating a lens) for receiving light and one or more physical interconnects, such as a network port, for receiving power and communicatively coupling with other system components.

In some embodiments, image sensor 112 may include a solid state device configured to capture light waves and/or other electromagnetic waves and convert the light into video images, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. For example, video camera 110 may include two image sensors, associated lenses, and data paths to the encoding and processing components in video camera 110. In some embodiments, multiple image sensors are supported by the same circuit board and/or processing subsystem containing processor 114, memory 116, encoder 118, audio channel 120, control circuit 122, analysis subsystem 124, network interface 126, and/or a backup state module 128.

Digital video data from image sensor 112 may be received by processor 114 for storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110.

In some embodiments, memory 116 may include one or more on-board and/or in-camera data storage devices, such as disk drives (solid-state drives, hard disk drives, hybrid drives, tape drives, etc.), universal serial bus (USB) flash drives, secure digital (SD) cards or SD extended capacity (SDXC) cards, and/or other form factors. For example, video cameras 110 may each include a storage interface and data storage device, such as an SD card, configured to store video data captured by image sensor 112 and encoded by encoder 118 without relying on VSaaS server 130, network storage devices 140.n, a network video recorder (not shown), and/or other components of surveillance system 100 for primary video storage. In some embodiments, video data may be stored in memory 116 of video cameras 110.1-110.n and selectively provided to VSaaS server 130 and/or user device 170 to support off-camera analytics, selective storage of high-value video data (detected events and/or selected for archiving), serving video data for user display on user device 1702, etc. For example, memory 116 may be used to record video data according to a video capture loop, where the data storage device has a capacity for storing hours, days, or weeks of video data before overwriting previously recorded video data in the data storage device, and VSaaS server 130 and/or a surveillance application on user device 170 may selectively access and/or replicate video data from the video cameras during the moving window of the loop cycle before it is erased (and replaced by more recent video data).

Encoder 118 may use various possible digital encoding and/or compression formats for encoding the video data generated by image sensor 112 into a time-dependent video stream composed of video frames at a determined frame rate (number of frames per second). In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats. In some embodiments, the compressed video format may generate a compressed video data stream that uses variable compression to remove redundancies between video data frames. For example, use of variable compression may cause video captured during a fixed time window to occupy different sizes in memory (e.g., 2 megabytes (MB) of compressed video data versus 4 MB of compressed video data for a minute of recording using the same variable compression codec, depending on the compressibility of the video content captured during the one minute time window).

Camera 110 may include audio channel 120 configured to capture audio data to be processed and encoded with image data in the resulting video stream. In some embodiments, one or more microphones may be selectively enabled to capture audio data in parallel with the image data captured by image sensor 112. For example, microphone may be configured with an audio sensor that captures sound waves and converts them into a time-based audio data stream. In some embodiments, encoder 118 may include an audio encoder that operates in conjunction with the video encoder to encode a synchronized audio data stream in the video stream. For example, the video format used to by encoder 118 may include one or more audio tracks for encoding audio data to accompany the image data during video stream playback.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, VSaaS server 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable VSaaS server 130, another video camera 110, and/or user device 170 to configure video formats, enable and disable filters, set motion detection, auto tracking, and similar features, and/or initiate video data streaming. In some embodiments, one or more systems may provide PTZ position control signals (and/or PTZ positioning commands converted to PTZ position control signals by control circuit 122) through the API.

In some embodiments, video camera 110 may include video analysis subsystem 124 configured for onboard video analytics. For example, video analysis subsystem 124 may be configured to use processor 114 and memory 116 to execute at least a portion of video analytics for video data captured by video camera 110. In some embodiments, video analysis subsystem 124 may be configured to operate similarly to video analysis subsystem 156 in VSaaS server 130, as further described below, and embody one or more analytics engines and/or analytical model libraries. In some embodiments, video analysis subsystem 124 may be configured to support real-time image classification and object detection within camera 110 without processing support from VSaaS server 130. For example, video analysis subsystem 124 may receive a video stream (from sensor 112 and/or encoder 118), classify the video frame to determine whether an object type of interest is present and, if so, initiate an object detector to determine the object's position within the video frame (and/or subsequent video frames).

Network interface 126 may include one or more wired or wireless connections to network 102 and/or a dedicated camera interface of VSaaS server 130. For example, network interface 126 may include an ethernet jack and corresponding protocols for IP communication with VSaaS server 130 and/or a network video recorder (not shown). In some embodiments, network interface 126 may include a power over ethernet (PoE) connection with a camera access point or gateway. PoE may enable both power for camera 110 and network data to travel on the same wire. In some embodiments, network interface 126 may enable an IP camera to be configured as a network resource with an IP address that is accessible on a LAN, WAN, or the internet. For example, VSaaS server 130 and/or user device 170 may be configured to selectively receive video from cameras 110 from any internet-connected location using internet addressing and security protocols.

In some embodiments, video camera 110 may include a backup state module 128 configured for maintaining backup state of clusters of cameras. For example, video cameras 110 may be clustered based on the immediate networks they are connected to. Upon installation or network change, the serial number, or camera identifier (ID) and trace route are sent to the VSaaS server 130. In this way, the backup state of the cluster is stored by camera identifier such that the backup state can be used as a lookup table when the data is to be retrieved. Certain rules for backup may be defined. For example, a data retention policy for a cluster with 4 cameras may be 30 days, where a camera produces 1 gigabyte (GB) of data per day (for simplicity). At the end of each day, a backup of the captured video data is stored according to a backup order and the backup state of the cluster is stored by the backup state module 128 in each video camera 110 of the cluster.

VSaaS server 130 may include a computer system configured as a video storage device or interface to a network video storage device to selectively receive the video streams from cameras 110. For example, VSaaS server 130 may be configured to receive video streams from each of cameras 110 for selective storage, analysis, and/or display through user device 170. In some embodiments, some or all of the functions of VSaaS server 130 may be embodied in a network video recorder collocated with some or all of cameras 110 and/or a proprietary network video server specifically configured to support cameras 110. In some embodiments, cameras 110 may send encoded video streams based on the raw image data collected from their respective image sensors 112, with or without video data compression. A single video stream may be received from each camera 110 and VSaaS server 130 may be configured to receive video streams from all connected cameras in parallel, as network bandwidth and processing resources allow.

VSaaS server 130 may include one or more server devices and/or associated network storage devices 140.$n$, where each server device includes at least one processor 132, at least one memory 134, at least one storage device 140, and at least one interface, such as camera interface 136, network interface 138, and/or storage interface 142. A plurality of VSaaS servers 130 may be configured for mounting within rack systems and maintained in a data center that is remote from cameras 110 and/or geographically distributed among a number of data centers in geographic locations for distributed, cloud-based surveillance services. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, VSaaS server 130 may interface with a local gateway or network video recorder that includes camera interface 136 configured for connection with one or more cameras 110. For example, camera interface 136 may include a plurality of ethernet ports and supporting protocols compatible with PoE standards for connecting to cameras 110.5-110.$n$. In some embodiments, camera interface 136 may include a PoE network switch for providing power to connected cameras and routing data packets to and from cameras 110.5-110.$n$, such as control and video data. In some embodiments, VSaaS server 130 may not include a camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD), solid state drive (SSD), flash memory-based removable storage (e.g., secure data (SD) card), embedded memory chips, etc. In some embodiments, storage device 140 is, or includes, a plurality of solid-state drives. In some embodiments, VSaaS server 130 may include internal storage device 140.1 and expandable storage or access to network storage that enables additional storage devices 140.$n$ to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.*n* may be of the same storage device type or a different storage device type. In some embodiments, data storage devices used for video data storage in cameras 110 may be configured similarly to storage devices 140.*n*.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.*n*. In some embodiments, storage interface 142 may include a wireless data connection with sufficient bandwidth for video data transfer. Depending on the configuration and protocols used by storage interface 142, storage device 140.*n* may include a corresponding interface adapter, firmware, and/or protocols for receiving, managing, and responding to storage commands from VSaaS server 130.

VSaaS server 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to VSaaS server 130 or remotely connected via network 102. Memory 134 may include a backup log subsystem configured to generate a log of backup replication events between peer video cameras 110 from within backup clusters.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to VSaaS server 130. Video capture subsystem 152 may be configured to pass each received video stream and/or selected video portions thereof to video storage subsystem 154, video analysis subsystem 156, and/or video display subsystem 158. For example, received video streams may be buffered by video capture subsystem 152 before being streamed to video storage subsystem 154 and split into dual video streams with different video parameters for video analysis subsystem 156 and video display subsystem 158.

In some embodiments, video storage subsystem 154 may include interface protocols and a set of functions and parameters for managing storage of video data in storage devices 140 and/or other network video storage for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video storage subsystem 154 may be configured to rely on in-camera storage (e.g., memory 116 and/or data storage devices therein) for primary storage of the captured video streams and selectively archive video data of particular interest, such as video data portions flagged by in-camera analysis subsystem 124 and/or analysis subsystem 156 as containing particular objects, events, or other parameters. In some embodiments, cameras 110 may be configured to send parity data, backup video data, and/or parity management logs to VSaaS server 130 for storage through video storage subsystem 154. This selectively off-loaded data from cameras 110 may support parity-based redundant storage among a group of video cameras. In some embodiments, video storage subsystem 154 may also include logic for recovering video data in the event of a storage failure by one or more of cameras 110. For example, video storage subsystem 154 may access parity management logs to determine the location of source video data blocks and corresponding parity blocks needed to recover the source video data of the lost camera, as well as initiate and oversee the data recovery process to storage device 140.$n$ and/or to a replacement camera 110 or storage device therein (such as a replacement SD card).

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video analysis subsystem 156 may include event handling logic for determining response to detection of one or more detected events, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to a network video recorder and/or via network 102 within a LAN, WAN, VPN, or the internet.

In some embodiments, a backup log subsystem 160 may be configured to generate a recorded log of backup replication events between peer video cameras 110 from within backup clusters. For example, the backup log subsystem 160 may include a data store or database configuration for storing a log of the backup replication events between peer video cameras 110 in each backup cluster. The peer video cameras 110 may be identified based on the camera identifier (e.g., serial number of the camera). A specified backup order may be used to determine which peer video camera is the target location of the backup replications for the other peer video cameras in the backup cluster, daily. The target location of the backup replications are rotated among the peer video cameras in the backup cluster according to the specified backup order.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, user device 170 may be a personal computer or mobile device running a surveillance monitoring and management application configured to provide a user interface for VSaaS server 130. In some embodiments, user device 170 may be configured to access cameras 110 and/or their respective video streams through VSaaS server 130 and/or directly through network 102. In some embodiments, one or more functions of VSaaS server 130 may be instantiated in user device 170 and/or one or more functions of user device 170 may be instantiated in VSaaS server 130 and/or a network video recorder (not shown).

User device 170 may include one or more processors 172 for executing compute operations or instructions stored in memory 174 for accessing video data and other functions of VSaaS server 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include an account manager 188 configured to provide a user interface for identifying, configuring, and managing a secure user account for VSaaS server 130. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Account manager 188 may include interface protocols and a set of functions and parameters for identifying, configuring, and managing access to VSaaS server 130. For example, each of camera manager 184, configuration manager 186, and/or account manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or account manager 188 may provide changes parameters to the effected components, such as camera manager 184 sending camera configuration parameter changes to selected cameras 110, account manager 188 sending VSaaS account configuration parameter changes to VSaaS server 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data captured by cameras 110 and/or selecting, training, and managing those algorithms.

Figure 2:
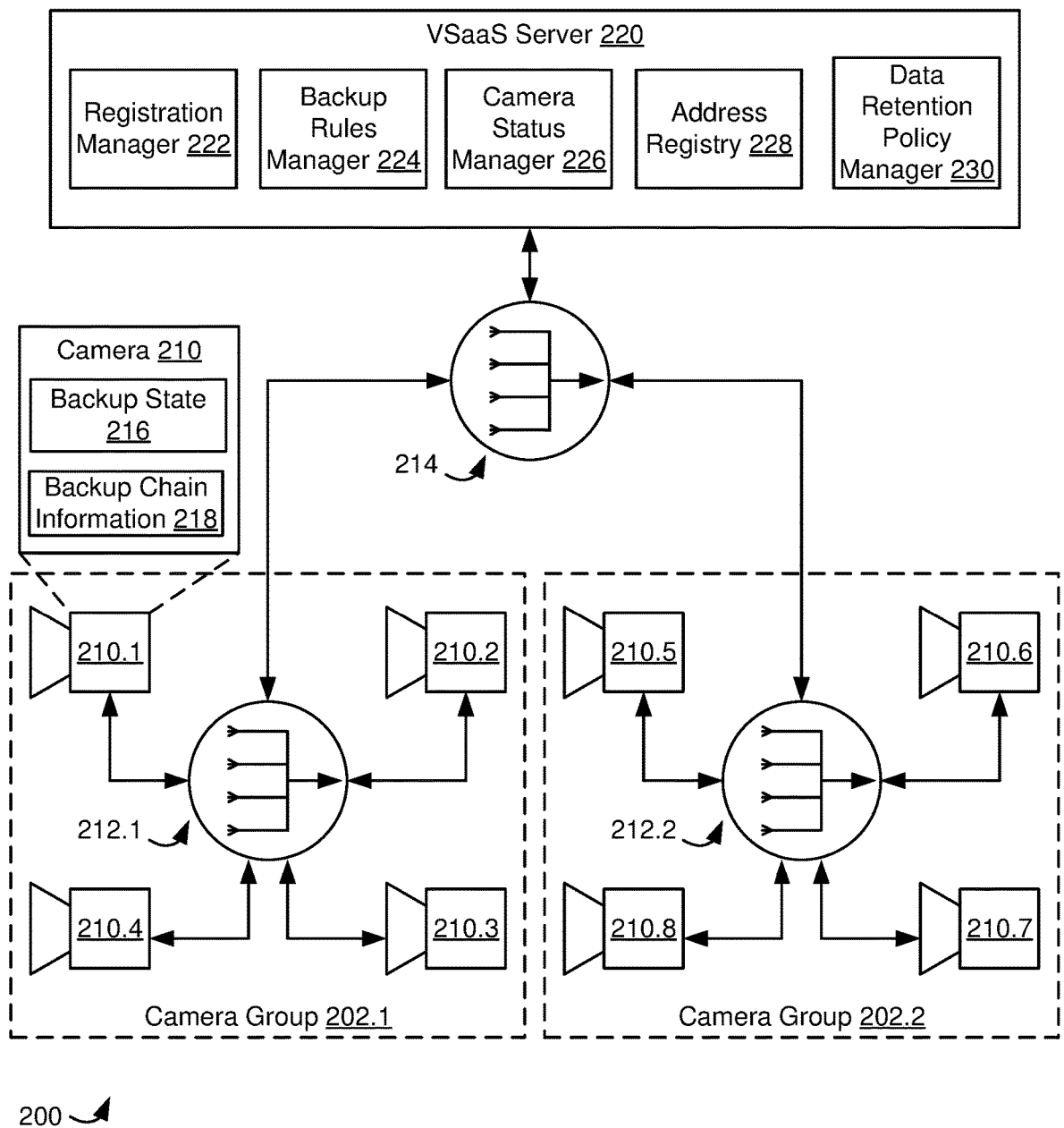
FIG. 2 schematically illustrates an example camera group topology that may be used for redundant video data storage, such as by the computer-based surveillance system of FIG. 1.

FIG. 2 shows a schematic representation of an example camera group topology that may be used for redundant video data storage in a computer-based surveillance system 200, such as surveillance system 100 in FIG. 1. Each example topology is shown based on camera groups including four cameras, but any number of peer video cameras may be used for each topology. In some embodiments, the topology may be based on a plurality of video cameras 210 configured similarly to cameras 110 in FIG. 1. In some embodiments, a majority of the video cameras 210 in the topology may have a standard configuration with a first set of compute resources, including processor, memory, and/or data storage device configurations. In some embodiments, the target peer video camera where the other peer video cameras send their backup data may rotate among video cameras 210 in the backup cluster after each synchronization event, (e.g., daily), to distribute the workload and/or storage demands on the designated target video camera.

In FIG. 2, a first video camera group 202.1 and a second camera group 202.2 may be configured to be clustered in backup clusters based on a network topology in a registration phase. A registration manager 222 of the VSaaS server 220 may assign peer video cameras 210 to a camera group 202 based on network topology information. For example, peer video cameras 210.1, 210.2, 210.3, 210.4 may be configured to move their backup data within their backup cluster, or camera group 202.1 based on their network topology 212.1. Similarly, peer video cameras 210.5, 210.6, 210.7, 210.8 may also be configured to move their backup data within their backup cluster, or camera group 202.2 based on their network topology 212.2 in order to assure that failure of one of the peer video cameras does not result in data loss for its group. During the registration phase, the registration manager 222 receives the serial number of the camera 210 and a route trace through the network, including the lowest level of the network topology 212 and other layers of the network topology 214. The registration manager 222 may be configured to set up backup clusters based on the network topology of the camera group 202. On installation or addition to a camera group 202, the camera identifier, such as a serial number of the camera, and the route trace is sent from the camera 210 to the registration manager 222 to determine the backup cluster, as stored in the address registry 228. A data retention policy manager 230 may be included in the VSaaS server 220 to receive a data retention policy of the surveillance system 200. For example, a thirty (30) day retention cycle with 4 cameras in the cluster may be the configuration as selected by a user or administrator of the surveillance system 200. Different data retention policies may be implemented based on the storage capacity of storage devices within each camera 210. In some embodiments, it may be assumed that each camera 210 produces one (1) GB of data per data.

A backup order, such as backup chain information 218, may be determined by the VSaaS server 220 by a backup rules manager 224 and sent to each camera 210 through the network topology 212, 214. For example, peer video camera 210.1 may be configured to receive video data from each peer video camera 210.2, 210.3, and 210.4 and send its backup source video data (the video data that peer video camera 210.1 captured itself) to the next peer video camera in the backup order, such as 210.2. Because the backup chain information 218 is stored within each camera 210 of a camera group 202, the target of the backup replication event is predetermined. However, if peer video camera 210.2 failed or otherwise was unable to receive the backup data from peer video 210.1, the backup source video data would be sent to the next peer video camera 210.3 in the backup order to avoid the loss of its data. In this way, each peer video camera is configured to backup data in camera group 202.1 according the specified backup order, as stored in the backup chain information 218.

The backup rules manager 224 of the VSaaS server 220 may define additional backup rules to avoid data loss. For example, as an additional backup, if the number of operational cameras is below a certain threshold, such as two cameras, then an additional camera from another camera group, such as camera group 202.2, may be brought into camera group 202.1. For example, backup state data 216 is stored within each peer video camera 210 as well as at the VSaaS server 220 by a camera status manager 226 to assure that failure of multiple peer video cameras does not result in data loss. While two groups are shown, similar configurations could be implemented for any number of groups (greater than 1), where each peer video camera in each group sends its backup state data to the camera status manager 226, where the address registry 228 tracks the backup clusters and the peer video cameras 210 included in each group. In some embodiments, the camera status manager 226 may be configured to track the backup state of each camera and identify which cameras have failed.

The backup rules manager 224 may also define when the backups are scheduled to occur. For example, each camera 210 may be configured to send backup data continuously, on a scheduled periodic basis, and/or an event basis, such as a notification from VSaaS server 220. In some embodiments, cameras 210 may be configured with data collection time windows based on the data backup and retention policy. For example, the data backup and retention policy may specify that the cameras are backed up daily and data is retained on a 30-day cycle. Under this policy, the data collection time window may be one day and cameras 210 may be scheduled to provide backups at a specific time each data (generally during a period of low camera use and/or network traffic). In some embodiments, a synchronization event may be scheduled at a particular time daily for cameras 210 to backup their video data and update VSaaS server 220 on the backup states and locations for each camera 210.

Figure 3:
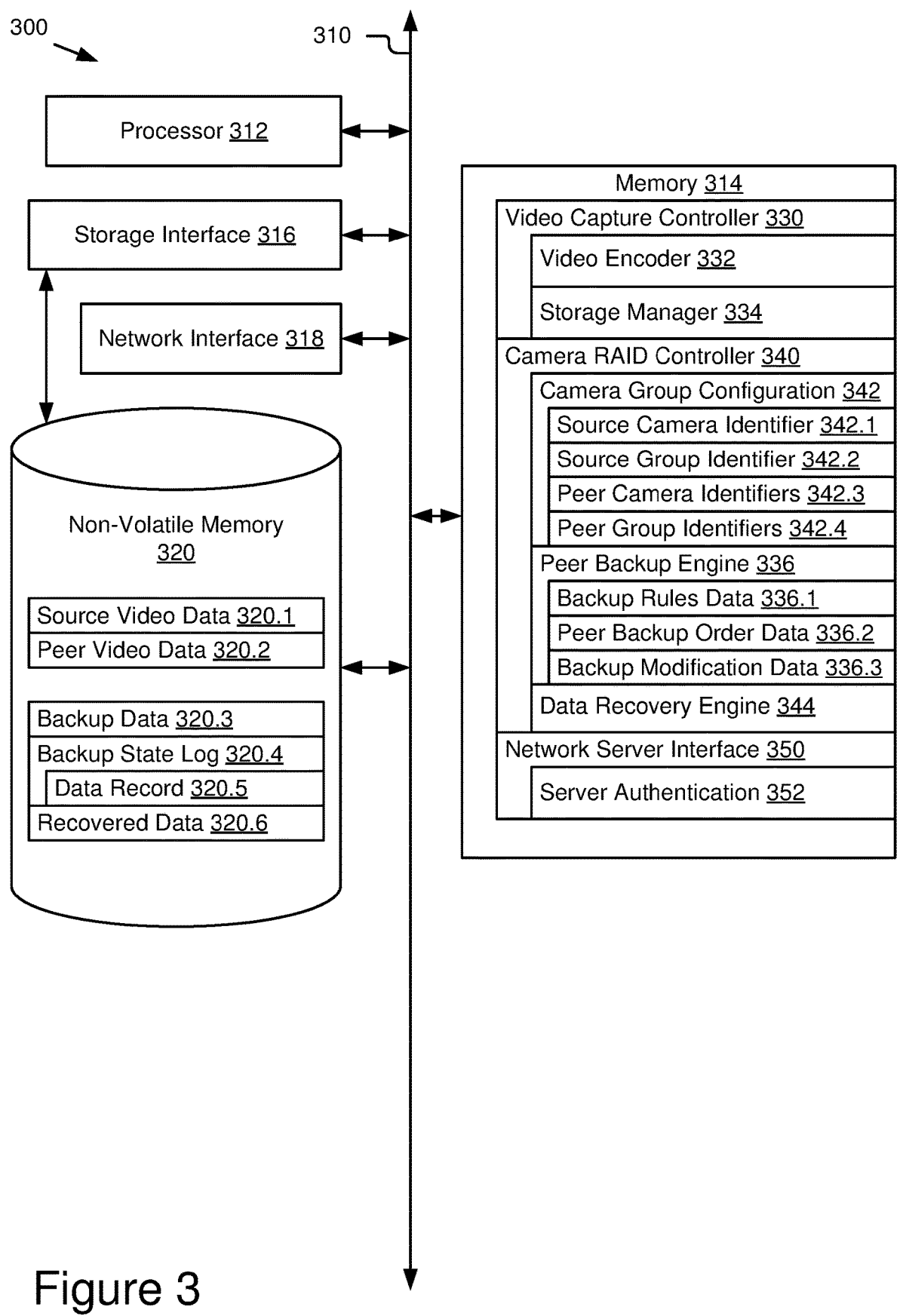
FIG. 3 schematically illustrates some elements of the computer-based surveillance system of FIG. 1.

FIG. 3 schematically shows selected modules of a surveillance system 300 configured for using in camera data storage for maintaining the video data in a redundancy scheme that prevents data loss from video camera loss or failure. Surveillance system 300 may incorporate elements and configurations similar to those shown in FIGS. 1-2. For example, surveillance system 300 may be configured in a plurality of video cameras similar to video cameras 110, and 210. In some embodiments, one or more of the selected modules may access or be instantiated in the processors, memories, and other resources of video cameras configured for video capture, similar to video cameras 110. For example, a video camera and its embedded or attached data storage device may be configured with some or all functions of video capture controller 330, camera redundant array of independent disks (RAID) controller 340, and/or network server interface 350 to provide redundant video data storage in a distributed fashion at the edge of surveillance system 300 before selectively providing the video stream and generated metadata to other system components, such as a VSaaS server or user device, for additional analytics, storage, and/or use in a surveillance application. In some embodiments, each video camera in a group may be configured with video capture controller 330 and peer modules of camera RAID controller 340, such as peer backup engine 336, camera group configuration 342 and data recovery engine 344.

Surveillance system 300 may include a bus 310 interconnecting at least one processor 312, at least one memory 314, and at least one interface, such as storage interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element. In some embodiments, processor 312 and memory 314 may be compute resources available for execution of logic or software instructions stored in memory 314 and computation intensive tasks may be configured to monitor and share these resources.

Storage interface 316 may be configured to provide a data storage device for storing video data in each video camera. Storage interface 316 may include a physical interface for connecting to one or more internal and/or removable storage devices using an interface protocol that supports storage device access. For example, storage interface 316 may include a PCIe, SATA, SCSI, SAS, USB, Firewire, SD, extended secure digital (XSD), or similar storage interface connector supporting storage protocol access to some or all of non-volatile memory 320. Depending on the configuration and protocols used by storage interface 316, non-volatile memory 320 may include a corresponding interface adapter, firmware, and/or protocols for receiving, managing, and responding to storage commands from the video camera. In some embodiments, non-volatile memory 320 may include a removable data storage device, such as an SD card, and storage interface 316 may include hardware (slot and conductor configuration) and software for storing to and reading from the removable data storage device.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within or attached to the video cameras for storing and accessing video data.

Surveillance system 300 may include a plurality of modules or subsystems that are stored and/or instantiated in memory 314 for execution by processor 312 as instructions or operations. For example, memory 314 may include a video capture controller 330 configured to enable each video camera to capture and store video streams for that camera. Memory 314 may include a camera RAID controller 340 configured to manage redundant storage of video data across a video camera group and/or recovery of video data in the event of loss or failure of camera video storage. Memory 314 may include a network server interface configured to provide a network interface for accessing and managing video data on the video cameras from a VSaaS server, video surveillance application, or other access point for a group of smart video cameras.

Video capture controller 330 may include interface protocols, functions, parameters, and data structures for capturing and storing video data within each video camera. For example, video capture controller 330 may be an embedded firmware application and corresponding hardware in a video camera configured to store video data for selective access through a VSaaS server and/or video surveillance application. Video capture controller 330 may be configured as an interface between video data captured through the camera's video image sensor and in camera storage, such as non-volatile memory 320, for the encoded video stream.

Video capture controller 330 may include image sensor interface protocols and a set of functions, parameters, and data structures for receiving video streams from the video image sensors. For example, video capture controller 330 may include video data channels and related data buffers for managing at least one video data stream. In some embodiments, video capture controller 330 may include a plurality of hardware and/or software modules configured to use processor 312 and memory 314 to handle or manage defined operations of video capture controller 330. For example, video capture controller 330 may include a video encoder 332 and a storage manager 334.

In some embodiments, video capture controller 330 may include one or more video encoders 332 configured to encode video data, such as raw video data from the image sensor, in a desired video format. For example, video encoder 332 may receive raw video frames in accordance with a defined frame rate and resolution to generate a time-dependent video stream that may be further processed according to a selected video codec and corresponding compression scheme. In some embodiments, video encoder 332 may be configured to generate video data for a defined resolution, image size, frame rate, codec, compression factor, color/gray-scale, or other video format parameters. In some embodiments, video encoder 332 may support one or more codecs for video encoding that support variable compression. As a result, each camera in a group of cameras may generate video data at different data sizes for the same recording window.

Storage manager 334 may include storage interface protocols and a set of functions, parameters, and data structures for managing storage of video data in non-volatile memory 320, for later retrieval and use by the camera's onboard analytics and/or access, display, and/or transfer to other systems through network server interface 350. For example, storage manager 334 may write camera video stream data from video data buffers and/or storage path video data from video encoder 332 to non-volatile memory 320 as source video data 320.1. In some embodiments, storage manager 334 may support peer backup engine 336 to allow video data from non-volatile memory 320 to be sent to a peer video camera. For example, storage manager 334 may read video data from non-volatile memory 320 and/or video data buffers in video capture controller 330 to be sent to other cameras as peer video data. In some embodiments, storage manager 334 may also support peer backup engine 336 for storing distributed parity data and/or backup data from other cameras in non-volatile memory 320. For example, peer cameras may use storage manager 334 to store source video data 320.1, peer video data 320.2 from other cameras, backup data 320.3 (peer video data sent as backup from another camera that may have failed), and a backup state log 320.4 that includes a log of where the backup data of peer video cameras have been stored during the data retention policy, where the backup state log 320.4 may include a data record 320.5. In some embodiments, storage manager 334 may be configured to support data recovery engine 344 and store recovered data 320.6 in non-volatile memory 320.

In some embodiments, storage manager 334 may be configured to manage video storage space in non-volatile memory 320 in accordance with one or more data retention and/or data archiving schemes. For example, surveillance system 300 may support continuous and/or triggered recording of video data from associated cameras and storage manager 334 may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. In some embodiments, storage manager 334 may also include a metadata manager to receive and store video metadata as tags or metadata tracks in the video data or in an associated metadata table, file, or similar data structure associated with the corresponding video data objects.

Camera RAID controller 340 may include APIs and a set of functions, parameters, and data structures for managing redundant storage of video data using in-camera data storage across the non-volatile memory devices of a group of cameras. For example, camera RAID controller 340 may be replicated or distributed among the controllers of each video camera in the camera group and designate each camera's role and contents for the redundant storage of the group's video data. For example, the camera group may generate synchronized RAID stripes based on common timestamps, where each data collection window is defined by a starting and ending timestamp used across the video cameras to access and recovery of RAID data. In some embodiments, each video camera may be responsible for generating and storing its own timestamps, rather than receiving a synchronized timestamp. In an embodiment, a data retention policy may be defined such that the data collection window is one day.

In some embodiments, camera RAID controller 340 may include a plurality of hardware and/or software modules configured to use processor 312 and memory 314 to handle or manage defined operations of camera RAID controller 340. For example, camera RAID controller 340 may include a camera group configuration 342, a peer backup engine 336, and a data recovery engine 344. In some embodiments, each video camera in a camera group may include peer backup engine 336 and elements of camera group configuration 342 for communication with other video cameras. In some embodiments, data recovery may be managed by another component of surveillance system 300, such as a VSaaS server remotely accessing source video data 320.1, peer video data 320.1, backup data 320.3, and/or backup state log data 320.4 to generate recovered data 320.6 for the replacement video camera.

Camera group configuration 342 may include APIs and a set of functions, parameters, and data structures for determining how camera groups are configured and the topology for the RAID configuration. For example, camera group configuration 342 may include any number of video cameras, including cameras with different physical configurations (such as increased storage capacity), and correspond to any selected topology, such as the topologies described above with regard to FIG. 2. In some embodiments, each video camera may be configured with its own unique identifier and group identifiers, which may be designated a source camera identifier 342.1 and source group identifier 342.2. For example, source camera identifier 342.1 may be the unique camera identifier, such as a name, identification number, network address, etc., for the camera that generated the video data and the source group identifier 342.2 may be the unique identifier, such as a group name, group number, location identifier, etc., for the camera group to which that camera is assigned. In some embodiments, peer camera identifier 342.3 may be tags, types, and/or a reference list for the source camera identifiers 342.1 of the other video cameras in the camera group (having the same source group identifier 342.2). In some embodiments, peer group identifiers 342.4 may be used in topologies, such as FIG. 2, where a relationship is established with another camera group in the same surveillance system 300. For example, the network topologies 212.1 and 212.2 in FIG. 2 may be configured with peer group identifiers 342.4 for the video cameras in the other camera group. In some embodiments, the unique identifiers in camera group configuration 342 may directly or indirectly allow each video camera to communicate with other relevant video cameras through network interface 318 and secure peer-to-peer network communication for video data transfer and messaging.

Peer backup engine 336 may include APIs and a set of functions, parameters, and data structures for supporting the redundant storage of video data from each of the video cameras in the group. For example, each video camera, including the parity camera, may instantiate some or all of peer backup engine 336 to enable sending source video data 320.1 as peer video data 320.2 to other cameras, as well as receiving and storing backup data 320.3 in some configurations. In some embodiments, peer backup engine 336 may be configured to use a predetermined backup rules data 336.1 to coordinate sending peer video data to other cameras according to a backup order defining a sequential order for rotating backups. For example, backup rules data 336.1 may be configured for the camera group to define a specific backup order of rotating backup events for the peer video data moving among the cameras, where the backup order is stored as peer backup order data 336.2.

Peer backup engine 336 may include backup modification data 336.3 in the event where the backup cluster requires modification due to the number of failed cameras exceeding a predetermined threshold. For example, if a camera group includes four cameras, up to two cameras may fail, leaving two other cameras to exist in the camera group. However, if a third camera fails, the backup cluster may require modification to include another camera from another backup cluster group. The backup modification data 336.3 may include the camera identifier information of the other camera pulled into the group to ensure no data loss.

Data recovery engine 344 may include APIs and a set of functions, parameters, and data structures for recovering redundant copies of video data for a failed video camera, video camera storage device, or a portion thereof. For example, if a video camera in the group fails or is otherwise lost, a failed data retrieval event may be determined and the corresponding video data from the other cameras may be used to reconstruct recovered data 320.6 and stored to a new location, such as reconstructing the video data in a replacement camera or offloading the recovered data to a network video resource for analysis, archiving, or other use. In some embodiments, data recovery engine 344 may be instantiated on one or more video cameras in the camera group. In some embodiments, data recovery engine 344 may be selectively installed or activated after a camera failure event. In some embodiments, some or all of data recovery engine 344 may be implemented in a network resource, such as a VSaaS server and coordinate recovery over the network. For example, in the event of a failure of a peer video camera, the VSaaS server may recover the backup data for the peer video camera and initiate rebuild of the peer video data in a replacement camera by reprocessing the backup data and the peer video data from the other video cameras in the group.

Network server interface 350 may include APIs and a set of functions, parameters, and data structures for interacting with a network video server, such as a VSaaS server or other video storage server, and/or a user display application, such as a surveillance application. For example, network server interface 350 may include a monitoring or display configuration for displaying one or more video streams in real-time or near real-time on a graphical user display of a user device and/or receive video navigation commands from the user device to selectively display stored video data from non-volatile memory 320. In some embodiments, network server interface 350 may maintain an index of real-time/near real-time video streams and/or stored video streams that are available for access by the surveillance application from the camera group. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Network server interface 350 may be configured to support the surveillance application when instantiated in a VSaaS server, end user device, network video recorder, or another system accessible via a network within a LAN, WAN, VPN, or the internet.

Network server interface 350 may include a server authentication function 352 for validating remote access to and from the video cameras. For example, secure connection to a VSaaS server and/or surveillance applications running on another device (such as an end user device) may require each video camera to be configured with a set of mutually authenticated credentials for each remote connection. In some embodiments, a set of camera credentials and/or account credentials for the camera group may be provided to each camera, along with encryption keys or similar security elements, as well as network server identifier, such as a server name, internet protocol (IP) address, or other network routing information. For example, the set of credentials may enable an initial connection or configuration session and generate a secure authentication token stored to each video camera and/or a gateway for accessing the camera group to enable automatic initiation of a secure data transfer connection between the video cameras and the surveillance application (and its hosting device or devices).

In some embodiments, the surveillance application may include a plurality of hardware and/or software modules configured to use a processor and a memory to handle or manage defined operations of the surveillance application. For example, the surveillance application may include a video manager, an alert manager, and an analytics manager.

The video manager may include APIs and a set of functions, parameters, and data structures for navigating and displaying video streams from the video cameras and stored through video capture controller 330. For example, the video manager may include a graphical user interface and interactive controls for displaying lists, tables, thumbnails, or similar interface elements for selecting and displaying video streams for particular cameras, times, locations, and/or events. In some embodiments, the video manager may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, the video manager may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

The alert manager may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, the alert manager may include a plurality of preset alert conditions with associated event parameters and allow a user to enable and disable alert types and/or change associated event parameters. In some embodiments, the alert manager may be configured to operate in conjunction with event overlay function to overlay graphical elements representing detected events or event indicators on video streams displayed through the video manager. For example, detected motion, objects, or faces may be boxed or highlighted, tagged with relevant identifiers, or otherwise indicated in the video playback on the user device.

The analytics manager may include APIs and a set of functions, parameters, and data structures for selecting, training, and managing event detection algorithms. For example, the analytics manager may include a user interface to an analytical model library for one or more analytics engines, either in-camera analysis subsystems or off-camera analytics engines, such as those supported by the VSaaS server. In some embodiments, the event detection algorithms may include a set of parameters and/or model weights that are preconfigured based on training data sets processed independent of surveillance system 300. For example, the analytics manager may include object detection algorithms for common objects, situations, and camera configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may interface directly with an analytics engine for selecting, training, managing, and using the event detection algorithms configured through the analytics manager.

FIGS. 4a, 4b, 4c, 4d, 4e, 4g, 4h, 4i, 4j, and 4k, and shows example fault-tolerant redundant storage scheme 400 for a video data unit stored by the computer-based surveillance systems of FIGS. 1-3. FIGS. 4f and 4l schematically illustrate example representations of data in a fault-tolerant redundant storage scheme 400 for a video data unit stored by the computer-based surveillance systems of FIGS. 1-3. While scheme 400 is shown for four cameras 410.1-410.4, it may be applied to any number of video cameras in a camera group. FIGS. 4a, 4b, 4c, 4d, and 4e represent a scenario where the four cameras are operational, the predetermined data retention policy is for 30 days and where each camera is estimated to produce 1 GB of video data, as an example. In some embodiments, the data retention policy and backup policy may be configured based on the maximum capacity of the non-volatile storage capacity (individual and/or cumulative across the peer group) of cameras 410 to ensure that cameras 410 will be able to store the video data and backup data according to the data retention policy without running out of space or overwriting data still within its retention period.

Figure 4A:
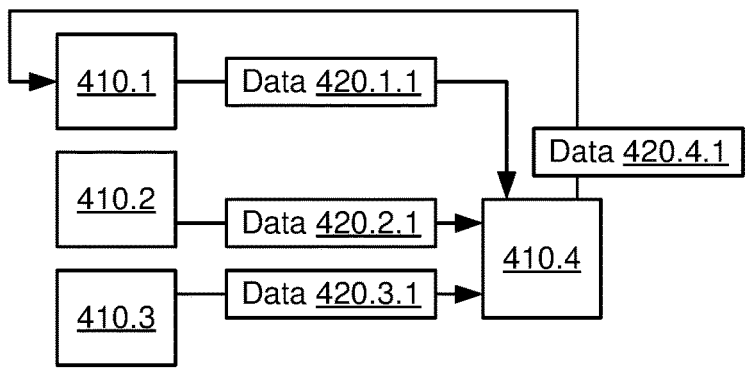
FIG. 4*a* schematically illustrates example fault-tolerant redundant storage scheme for a video data unit stored by the computer-based surveillance system of FIG. 1.

FIG. 4a illustrates a fault-tolerant redundant storage scheme 400 for redundant storage across a video camera group including video cameras 410.1-410.4. Each camera 410 may each start collecting video data from their respective image sensors and processed through their respective encoders (and variable compression codecs). Backup video data 420 from each camera may be stored in a target storage location on a peer video camera based on the backup order stored on each camera. In FIG. 4a, cameras 410.1, 410.2, and 410.3 store their respective backup video data 420.1.1, 420.2.1, and 420.3.1 to camera 410.4. The backup video data 420.4.1 of camera 410.4 is stored at camera 410.1. FIG. 4a represents the end of day 1, where each camera backups its source video data to a specified target camera based on the backup order.

Figure 4B:
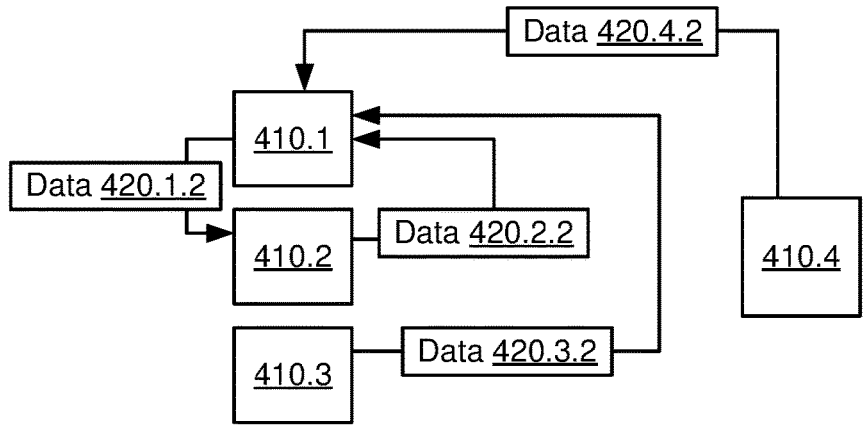
FIG. 4b schematically illustrates an example fault-tolerant redundant storage scheme for a video data unit stored by the computer-based surveillance system of FIG. 1.

FIG. 4b illustrates the end of day 2 where cameras 410.2, 410.3, and 410.4 store their respective backup video data 420.2.2, 420.3.2, and 420.4.2 to camera 410.1. The backup video data 420.1.2 of camera 410.1 is stored at camera 410.2.

Figure 4C:
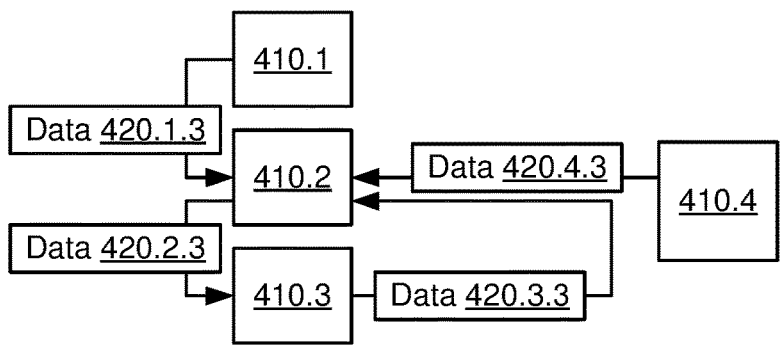
FIG. 4c schematically illustrates an example fault-tolerant redundant storage scheme for a video data unit stored by the computer-based surveillance system of FIG. 1.

FIG. 4c illustrates the end of day 3 where cameras 410.3, 410.4, and 410.1 store their respective backup video data 420.3.3, 420.4.3, and 420.1.3 to camera 410.2. The backup video data 420.2.3 of camera 410.2 is stored at camera 410.3.

FIG. 4d illustrates the end of day 4 where cameras 410.4, 410.1, and 410.2 store their respective backup video data 420.4.4, 420.1.4, and 420.2.4 to camera 410.3. The backup video data 420.3.4 of camera 410.3 is stored at camera 410.4.

FIG. 4e illustrates the end of day 5 where cameras 410.1, 410.2, and 410.3 store their respective backup video data 420.1.5, 420.2.5, and 420.3.5 to camera 410.4. The backup video data 420.4.5 of camera 410.4 is stored at camera 410.1.

FIG. 4f schematically illustrates an example representation of data in a fault-tolerant redundant storage scheme 400 in a table that illustrates data in a day column 430, a source column 432, a destination column 434, and a storage used column 436 by camera. As shown in the table in FIG. 4f, on day 1, source data from cameras 1, 2, and 3 are stored at camera 4 while source data from camera 4 is stored at camera 1. On day 2, source data from cameras 2, 3, and 4 are stored at camera 1 while source data from camera 1 is stored at camera 2. On day 3, source data from cameras 3, 4, and 1 are stored at camera 2 while source data from camera 2 is stored at camera 3. On day 4, source data from cameras 4, 1, and 2 are stored at camera 3 while source data from camera 3 is stored at camera 4. FIG. 4f also shows the cumulative storage at each camera in column 436. For example, on day 1, 1 GB is used at camera 1 (from camera 4), and 3 GBs are used at camera 4 (from cameras 1, 2, and 3). By day 2, 4 GBs are used at camera 1 (from day 1 and cameras 2, 3, and 4), 1 GB is used at camera 2 (from camera 1), and 3 GBs remain used at camera 4 (from day 1). By day 3, 4 GBs remain used at camera 1, while 4 GBs are used at camera 2 (from day 2 and cameras 3, 4, and 1), 1 GB is used at camera 3 (from camera 2), and 3 GBs remain used at camera 4. By day 4, 4 GBs are used at all cameras. Thus, the storage used is normalized every four days where all four cameras remain operational.

Figure 4G:
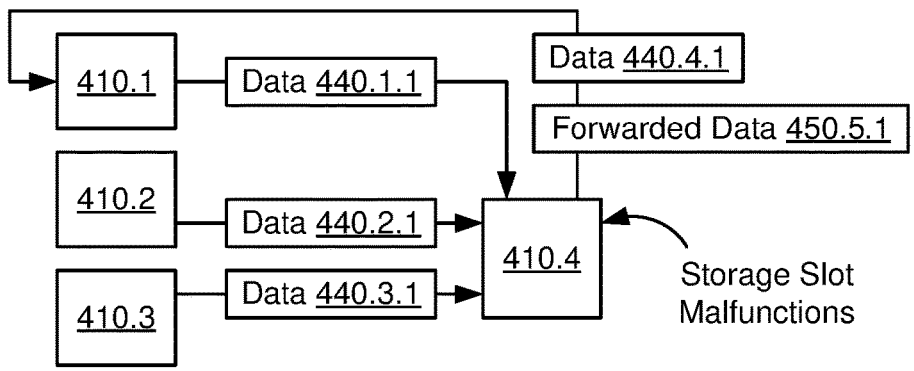
FIG. 4g schematically illustrates an example fault-tolerant redundant storage scheme for a video data unit stored by the computer-based surveillance system of FIG. 1.

FIGS. 4g, 4h, 4i, 4j, and 4k represent a scenario where three of the four cameras are operational, the data retention policy is for 30 days and where each camera is estimated to produce 1 GB of video data, as an example. FIG. 4g illustrates a fault-tolerant redundant storage scheme 400 for redundant storage across a video camera group including video cameras 410.1-410.4. Each camera 410 may each start collecting video data from their respective image sensors and processed through their respective encoders (and variable compression codecs). Backup video data 420 from each camera may be stored in a target storage location on a peer video camera based on the backup order stored on each camera. In this scenario, camera 4, or camera 410.4, malfunctions or otherwise fails such that data cannot be stored at the backup storage device on camera 4. The backup order remains the same from the scenario in FIGS. 4a-4f. In FIG. 4g, cameras 410.1, 410.2, and 410.3 store their respective backup video data 440.1.1, 440.2.1, and 440.3.1 to camera 410.4. The backup video data 440.4.1 of camera 410.4 is stored at camera 410.1. However, because the backup storage device fails at camera 4, the video data of cameras 410.1, 410.2, and 410.3 are sent as forwarded video data 450.5.1 to camera 410.1, the next camera in the backup chain. FIG. 4g represents the end of day 1, where each camera backups its source video data to a specified target camera based on the backup order.

Figure 4H:
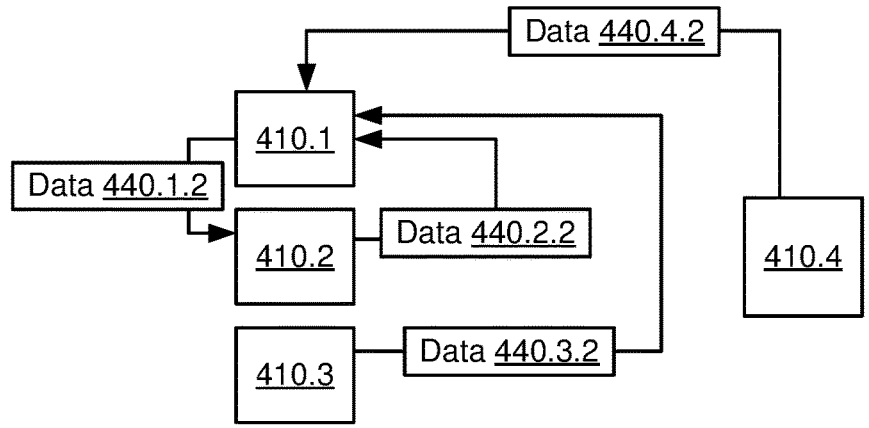
FIG. 4h schematically illustrates an example fault-tolerant redundant storage scheme for a video data unit stored by the computer-based surveillance system of FIG. 1.

FIG. 4h illustrates the end of day 2 where cameras 410.2, 410.3, and 410.4 store their respective backup video data 440.2.2, 440.3.2, and 440.4.2 to camera 410.1. The backup video data 440.1.2 of camera 410.1 is stored at camera 410.2.

Figure 4I:
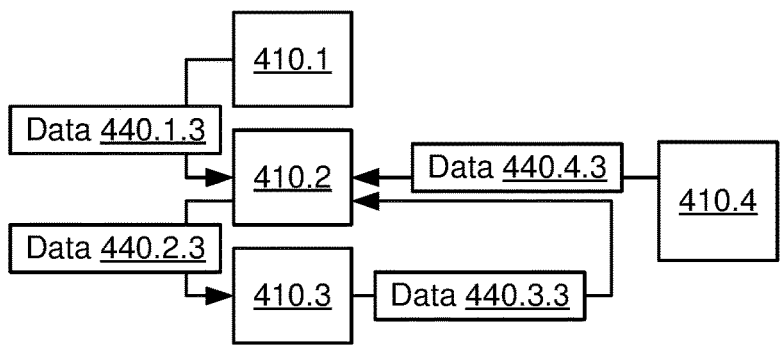
FIG. 4i schematically illustrates an example fault-tolerant redundant storage scheme for a video data unit stored by the computer-based surveillance system of FIG. 1.

FIG. 4i illustrates the end of day 3 where cameras 410.3, 410.4, and 410.1 store their respective backup video data 440.3.3, 440.4.3, and 440.1.3 to camera 410.2. The backup video data 440.2.3 of camera 410.2 is stored at camera 410.3.

FIG. 4j illustrates the end of day 4 where cameras 410.4, 410.1, and 410.2 store their respective backup video data 440.4.4, 440.1.4, and 440.2.4 to camera 410.3. The backup video data 440.3.4 of camera 410.3 is stored at camera 410.4. However, because the backup storage device at camera 4 is non-operational, the backup video data 440.3.4 is sent as forwarded data 450.5.2 to camera 1, or camera 410.1.

FIG. 4k illustrates the end of day 5 where cameras 410.1, 410.2, and 410.3 store their respective backup video data 440.1.5, 440.2.5, and 440.3.5 to camera 410.4. However, because the backup storage device at camera 4 is non-operational, the backup video data 440.1.5, 440.2.5, and 440.3.5 is sent as forwarded data 450.5.3 to camera 2, the next camera in the backup order. The backup video data 440.4.5 of camera 410.4 is stored at camera 410.1.

FIG. 4l schematically illustrates an example representation of data in a fault-tolerant redundant storage scheme 400 in a table that illustrates data in a day column 460, a source column 462, a destination column 464, and a storage used column 466 by camera. As shown in the table in FIG. 4l, on day 1, source data from cameras 1, 2, and 3 are sent first to camera 4 and then forwarded and stored at camera 1 while source data from camera 4 is stored at camera 1. On day 2, source data from cameras 2, 3, and 4 are stored at camera 1 while source data from camera 1 is stored at camera 2. On day 3, source data from cameras 3, 4, and 1 are stored at camera 2 while source data from camera 2 is stored at camera 3. On day 4, source data from cameras 4, 1, and 2 are stored at camera 3 while source data from camera 3 is first sent to camera 4 and then forwarded to camera 1. On day 5, source data from cameras 1, 2, and 3 are sent first to camera 4 and then forwarded and stored at camera 2 while source data from camera 4 is stored at camera 1. On day 6, source data from cameras 2, 3, and 4 are stored at camera 1 while source data from camera 1 is stored at camera 2, the next camera in the backup order. On day 7, source data from cameras 3, 4, and 1 are stored at camera 2 while source data from camera 2 is stored at camera 3. On day 8, source data from cameras 4, 1, and 2 are stored at camera 3 while source data from camera 3 is first sent to camera 4 and then forwarded to camera 2, the next camera in the backup order. The process repeats, and for simplicity of illustration, on day 12, source data from cameras 4, 1, and 2 are stored at camera 3 while source data from camera 3 is first sent to camera 4 and then forwarded to camera 3, the next camera in the backup order.

FIG. 4l also shows the cumulative storage at each camera in column 466. For example, on day 1, 4 GB is used at camera 1 (from camera 4 and from cameras 1, 2, and 3 after being forwarded), and 3 GBs are used at camera 4 (from cameras 1, 2, and 3). By day 2, 7 GBs are used at camera 1 (from day 1 and cameras 2, 3, and 4) and 1 GB is used at camera 2 (from camera 1). By day 3, 7 GBs remain used at camera 1, while 4 GBs are used at camera 2 (from day 2 and cameras 3, 4, and 1), and 1 GB is used at camera 3 (from camera 2). By day 4, 8 GBs are used at camera 1 (7 GBs plus 1 GB from camera 3 because camera 4 failed), while 4 GBs remain used at camera 2, and 4 GBs are used at camera 3 (from day 3 and cameras 4, 1, and 2). By day 5, 9 GBs are used at camera 1 (8 GBs plus 1 GB from camera 4), 7 GBs are used at camera 2 (4 GBs plus 3 GBs from cameras 1, 2, and 3 because camera 4 failed), and 4 GBs remain used at camera 3. By day 6, 12 GBs are used at camera 1 (9 GBs plus 3 GBs from cameras 2, 3, and 4), 8 GBs are used at camera 2 (7 GBs plus 1 GB from camera 1 because camera 4 failed), and 4 GBs remain used at camera 3. By day 7, 12 GBs remain used at camera 1, 11 GBs are used at camera 2 (8 GBs plus 3 GB from cameras 3, 4, and 1), and 5 GBs are used at camera 3 (4 GBs plus 1 GB from camera 2). By day 8, 12 GBs remain used at camera 1, 12 GBs are used at camera 2 (11 GBs plus 1 GB from camera 3 because camera 4 failed), and 8 GBs are used at camera 3 (5 GBs plus 3 GB from cameras 4, 1, and 2). Again, for simplicity of illustration, the table then shows on day 12, 16 GBs are used at cameras 1, 2, and 3. Thus, the storage used is normalized every 12 days where all three of the four storage devices at the four cameras remain operational, even though 4 cameras are capturing video data.

Figure 5:
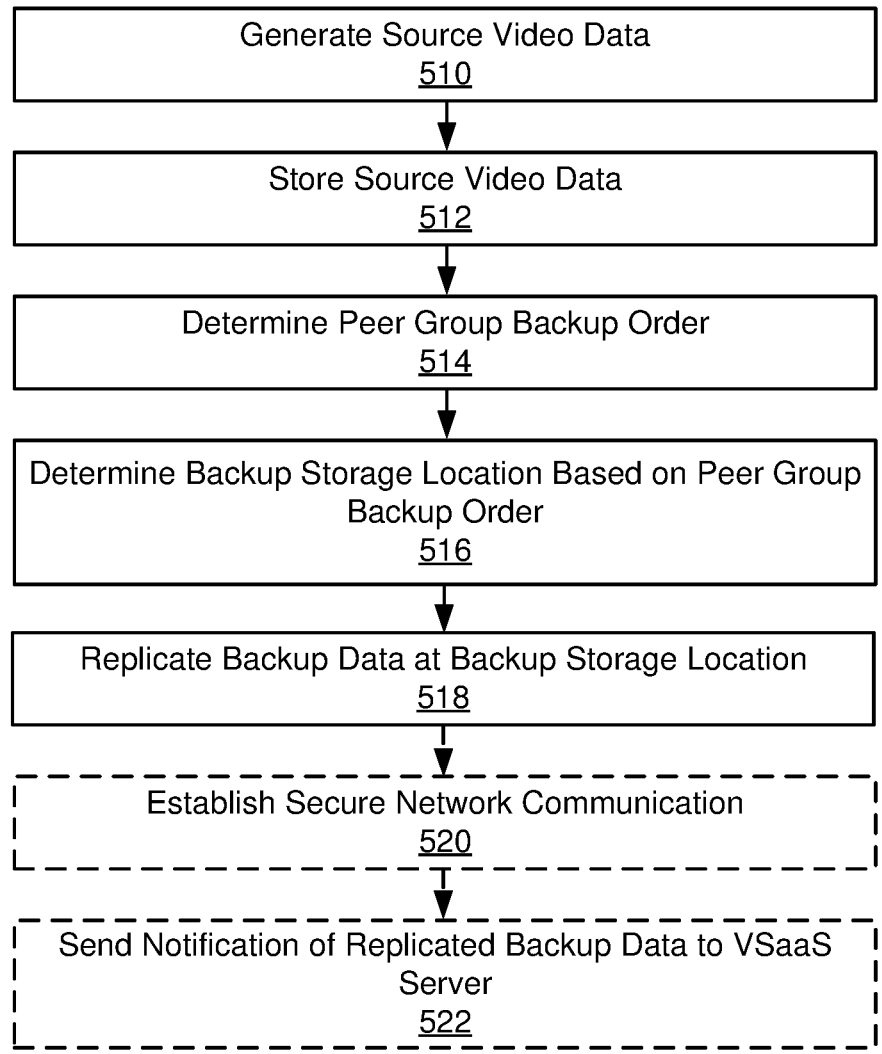
FIG. 5 is a flowchart of an example method of fault-tolerant redundant storage of video data in on-camera non-volatile memory of a peer video camera.

FIG. 5 is a flowchart of an example method of fault-tolerant redundant storage of video data in on-camera non-volatile memory of a peer video camera, i.e., according to method 500 illustrated by blocks 510-522 in FIG. 5.

At block 510, source video data may be generated by a video camera. For example, a parity camera may generate and encode video data from its image sensor.

At block 512, the source video data may be stored by the video camera. For example, the peer video camera may write the source video data to its non-volatile memory.

At block 514, a peer group backup order may be determined. For example, the backup cluster may comprise a camera group that includes a plurality of peer video cameras, where the peer group backup order lists a specific order of cameras in which backup replication events happen.

At block 516, a backup storage location is determined based on the peer group backup order. For example, the peer video camera may determine a target backup storage location on a target peer video camera based on the backup order determined from block 514.

At block 518, backup data is replicated at the backup storage location. For example, the peer video camera may be configured to store a backup of its source video data from its own non-volatile memory to the non-volatile memory of another video camera, the target backup storage location determined at block 516.

At block 520, a secure network communication may be established. For example, the peer video camera may establish a network communication to a VSaaS server over a network topology. This step is optional, as indicated by the dashed lines of block 520.

At block 522, a notification of the replicated backup data may be sent to the VSaaS server. For example, the peer video camera may send a notification of the replication event to the VSaaS server to be stored in a backup state log, in an embodiment. In another embodiment, the backup state log may reside in each of the connected peer video cameras in the backup cluster and the notification may be sent to all cameras in the backup cluster. This step is optional, as indicated by the dashed lines of block 522.

Figure 6:
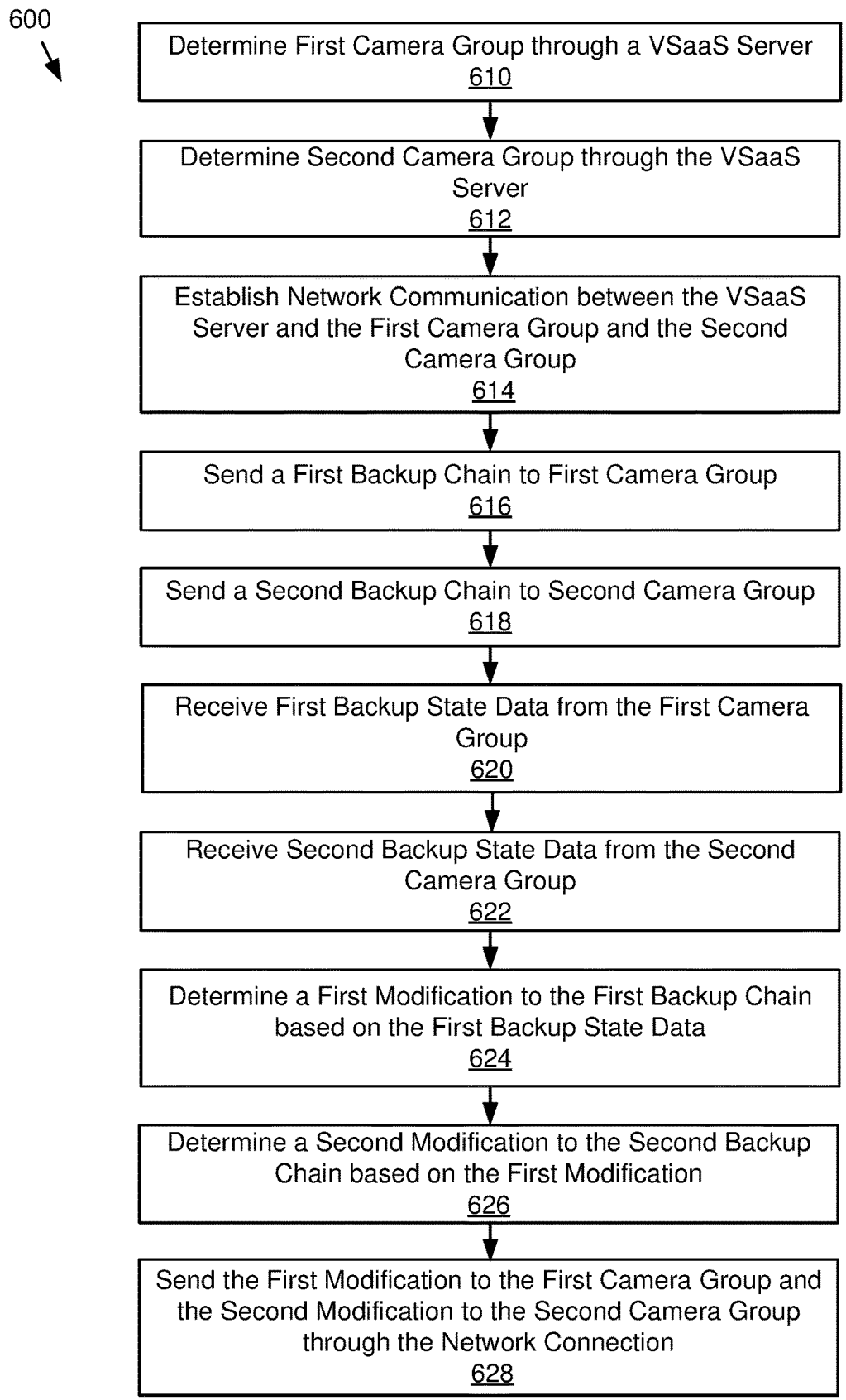
FIG. 6 is a flowchart of an example method of fault-tolerant redundant storage of video data in on-camera non-volatile memory for camera groups.

As shown in FIG. 6, surveillance system 300 may be operated according to an example method for fault-tolerant redundant storage of video data in on-camera non-volatile memory for camera groups, i.e., according to method 600 illustrated by blocks 610-628 in FIG. 6.

At block 610, a first camera group is determined through a VSaaS server. For example, a first camera group may be determined based on a network topology through the VSaaS server.

At block 612, a second camera group is determined through the VSaaS server. For example, a second camera group may be determined based on a network topology different from the first camera group through the VSaaS server.

At block 614, a network communication is established between the VSaaS server and the first camera group and the second camera group. For example, the network communication established between the VSaaS server, the first camera group and the second camera group may include network connectivity communications. The camera groups may be configured with camera identifiers and network addresses to enable network communication between the first and second camera group and the VSaaS server.

At block 616, a first backup chain is sent to the first camera group. For example, the VSaaS server may send the first backup chain, which may include a specified backup order of the cameras in the first camera group, each camera in the first camera group.

At block 618, a second backup chain is sent to the second camera group. For example, the VSaaS server may send the second backup chain, which may include a specified backup order of the cameras in the second group, to each camera in the second group.

At block 620, a first backup state data is received from the first camera group. For example, first backup state data is received at the VSaaS server from each camera in the first camera group.

At block 622, a second backup state data is received from the second camera group. For example, second backup state data is received at the VSaaS server from each camera in the second camera group.

At block 624, a first modification to the first backup chain is determined based on the first backup state data. For example, the first backup state data may indicate that the number of non-operational storage devices at cameras is below a predetermined threshold. Therefore, according to backup state rules at the VSaaS server, a modification is needed to the backup chain for the first camera group, such as moving a target camera from the second camera group to the first camera group and changing the backup order to include the target camera. Thus, the first modification is determined.

At block 626, a second modification to the second backup chain is determined based on the first modification. For example, the second modification may comprise removing the target camera that is moved to the first camera group by the first modification.

At block 628, the first modification may be sent to the first camera group and the second modification may be sent to the second camera group through the network connection. For example, the VSaaS server may send the first modification to the first camera group and the second modification to the second camera group over the secure network connection.

Figure 7:
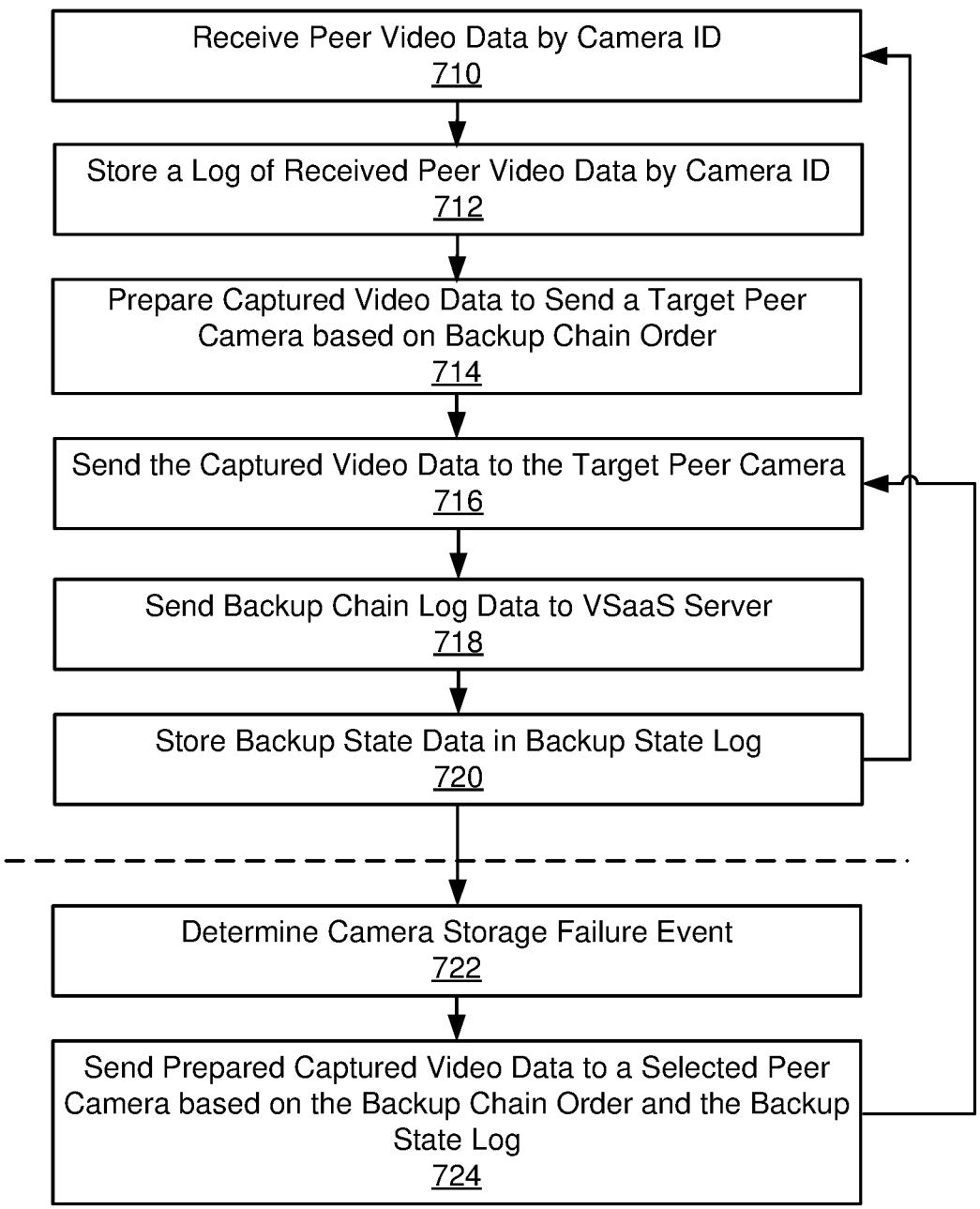
FIG. 7 is a flowchart of an example method of fault-tolerant redundant storage of video data in on-camera non-volatile memory for a video camera in a backup cluster.

As shown in FIG. 7, surveillance system 300 may be operated according to an example method for fault-tolerant redundant storage of video data in on-camera non-volatile memory for a video camera in a backup cluster, i.e., according to method 700 illustrated by blocks 710-724 in FIG. 7.

At block 710, peer video data may be received by camera identifier. For example, a backup storage device at a camera in a backup cluster may receive peer video data from the other peer video cameras in the backup cluster.

At block 712, a log of received peer video data may be stored by camera identifier. For example, the received peer video data may be logged by camera identifier in a table or data store at non-volatile memory of the camera.

At block 714, captured video data at the camera may be prepared to be sent to a target peer camera based on a backup chain order. For example, the captured source video data at the camera may be prepared to be sent to a target peer camera based on the backup chain order.

At block 716, the captured video data is sent to the target peer camera. For example, the camera may be configured to select the target camera as the backup storage location for backup video data from the camera.

At block 718, backup chain log data may be sent to the VSaaS server. For example, the backup video data from the camera successfully sent to the target camera may be recorded in the backup chain log data and sent to the VSaaS server.

At block 720, backup state data may be stored in a backup state log. For example, the camera may be configured to store backup state data in a backup state log to non-volatile memory for storage at the camera. The backup state data may describe the current backup state of where backup video data has been sent (e.g., the target camera). The backup state log may include camera identifiers and size of backup data sent. After block 720, the method 700 may repeat at block 710 or may proceed to block 722.

At block 722, a camera storage failure event is determined. For example, the target camera send a notification that the backup data replication attempt failed from block 716.

At block 724, the prepared captured video data is sent to a selected peer camera based on the backup chain order and the backup state log. For example, the selected peer camera may be the next camera in the backup chain order. Additionally, the selected peer camera may be the next camera in the backup chain order that has not yet been sent data yet, according to the backup state log. Returning to the example above illustrated in FIG. 4*l*, on day 12, camera 3 first attempts to send its backup video data to camera 4, but that camera's storage device malfunctioned, and so the next camera is camera 1, but that had already been sent data, so the next camera is camera 2, but that also had already been sent data, so the next camera is camera 3. Thus, it stores its own backup data to non-volatile memory. After block 724, method 700 repeats at block 710.

Figure 8:
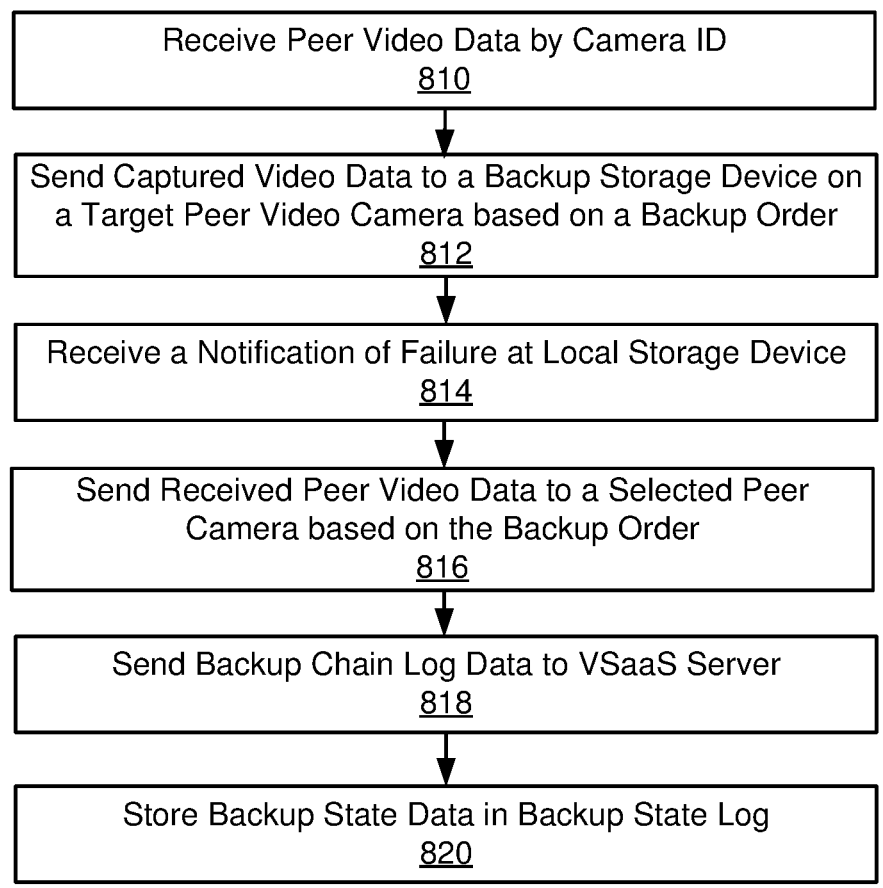
FIG. 8 is a flowchart of an example method of fault-tolerant redundant storage of video data in on-camera non-volatile memory for a video camera in a backup cluster.

As shown in FIG. 8, surveillance system 300 may be operated according to an example method for fault-tolerant redundant storage of video data in on-camera non-volatile memory for a video camera in a backup cluster, i.e., according to method 800 illustrated by blocks 810-820 in FIG. 8.

At block 810, peer video data may be received by camera identifier. For example, a backup storage device at a camera in a backup cluster may receive peer video data from the other peer video cameras in the backup cluster.

At block 812, captured video data at the camera may be sent to a backup storage device on a target peer video camera based on a backup order. For example, the captured video data in non-volatile memory at the camera may be replicated at the backup storage device on a target peer video camera based on a backup order stored at the camera.

At block 814, a notification of failure at local storage device may be received. For example, the camera may receive a notification of failure at its local storage device.

At block 816, received peer video data is sent to a selected peer video camera based on the backup order. For example, the camera may have received peer video data that now must be forwarded along to the next peer video camera in the backup order because of the failure at the local storage device.

At block 818, backup chain log data may be sent to VSaaS server. For example, the received peer video data stored at the selected peer video camera based on the backup order may be stored as backup chain log data that is sent to the VSaaS server. This ensures that the data may be located and retrieved, if needed.

At block 820, backup state data may be stored in a backup state log at the camera. For example, the backup state data generated by forwarding the received video data to the selected peer video camera at block 816 is stored as backup state data in the backup state log in non-volatile memory at the camera.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a first video camera comprising:
at least one image sensor configured to capture video images;
a network interface configured for communication with a first plurality of peer video cameras over a network, wherein at least one backup cluster of the first plurality of peer video cameras is based on a network topology of the network;
a non-volatile memory configured to store source video data captured by the at least one image sensor; and
a controller configured to:
receive peer video data from the first plurality of peer video cameras;
receive a backup order of the first plurality of peer video cameras based on an associated backup cluster of the at least one backup cluster; and
send the source video data to a backup storage device located at a target peer video camera of the first plurality of peer video cameras according to the backup order.

2. The system of claim 1, further comprising:
the first plurality of peer video cameras; and
a second plurality of video cameras, wherein:
the first plurality of peer video cameras and the first video camera comprise the associated backup cluster;
the second plurality of video cameras comprises a second backup cluster configured for communication over the network; and
responsive to a failure of the first video camera, the associated backup cluster is configured to send, to a target video camera among the second plurality of video cameras, backup data from the associated backup cluster comprising at least one of:
the source video data for the first video camera; or
the received peer video data for the first plurality of peer video cameras.

3. The system of claim 2, wherein:
responsive to the failure of the first video camera, the target video camera is configured to replace the first video camera in the backup order; and
the associated backup cluster is further configured to:
modify the backup order of the first plurality of peer video cameras in the associated backup cluster to include the target video camera;
establish secure network communication with a video storage server; and
send a request to the video storage server to remove the target video camera from the second backup cluster.

4. The system of claim 1, wherein the controller of the first video camera is further configured to:
establish secure network communication with a video storage server; and
send, to the video storage server, log data of the received peer video data and backup state data about the source video data for the first video camera sent to the backup storage device located at the target peer video camera of the first plurality of peer video cameras according to the backup order.

5. The system of claim 1, further comprising the first plurality of peer video cameras, wherein:
the peer video data includes a video stream from each peer video camera of the first plurality of peer video cameras;
each peer video camera of the first plurality of peer video cameras is configured to send, responsive to a synchronization event, video stream data generated during a data collection time window;
the controller of the first video camera is further configured to determine a maximum capacity for the peer video data generated during the data collection time window; and
the maximum capacity is determined based on a storage capacity of the backup storage device.

6. The system of claim 5, wherein the controller is further configured to determine the data collection time window based on a predetermined data retention policy.

7. The system of claim 1, wherein the controller of the first video camera is further configured to:
receive a listing of camera identifiers of the first plurality of peer video cameras in a backup cluster from a server; and
determine, based on the listing, the backup storage device on the target peer video camera based on an order of the listing of camera identifiers in the backup cluster.

8. The system of claim 1, wherein the controller of the first video camera is further configured to:
determine a failed data retrieval event at the first video camera; and
initiate data recovery associated with the failed data retrieval event based on a backup state log.

9. The system of claim 1, wherein:
the first plurality of peer video cameras and the first video camera comprise a camera group;
each video camera in the camera group is configured to:
determine a backup target camera from the camera group based on the backup order; and
send, to the backup target camera, captured video data by that video camera; and
the backup order comprises a sequential order of a plurality of unique identifiers, each unique identifier of the plurality of unique identifiers associated with each video camera in the camera group.

10. The system of claim 9, wherein:
a notification of failure to store the captured video data is received from the backup target camera; and
each video camera in the camera group is further configured to send, to a next camera after the backup target camera, the captured video data by that video camera, the next camera defined by the backup order.

11. A computer-implemented method, comprising:
generating, by a first video camera, source video data;
storing, by the first video camera, the source video data in a non-volatile memory of the first video camera;
receiving, by the first video camera over a network, peer video data from a first plurality of peer video cameras in a first backup cluster, wherein at least one backup cluster of the first plurality of peer video cameras is based on a network topology of the network;
storing, by the first video camera, the peer video data at a local storage device at the first video camera;
determining, based on a backup order of the first plurality of peer video cameras and the first video camera, a backup storage device located at a target peer video camera of the first plurality of peer video cameras; and
sending, by the first video camera, the source video data in the non-volatile memory of the first video camera to the backup storage device located at the target peer video camera of the first plurality of peer video cameras according to the backup order.

12. The computer-implemented method of claim 11, further comprising:
based on the first video camera failing, sending, to a target video camera among a second plurality of video cameras, backup data from the first backup cluster comprising at least one of:
source video data for the first video camera; or
the received peer video data for the first plurality of peer video cameras;
wherein:
the first plurality of peer video cameras and the first video camera comprise the first backup cluster; and
the second plurality of video cameras comprises a second backup cluster configured for communication over the network.

13. The computer-implemented method of claim 12, further comprising:
modifying the backup order of the first plurality of peer video cameras in the first backup cluster to include the target video camera, wherein the target video camera replaces the first video camera in the backup order;
establishing secure network communication with a video storage server; and
sending a request to the video storage server to remove the target video camera from the second backup cluster.

14. The computer-implemented method of claim 11, further comprising:
establishing secure network communication with a video storage server; and
sending, to the video storage server, log data of the received peer video data and backup state data about the source video data for the first video camera sent to the backup storage device located at the target peer video camera of the first plurality of peer video cameras according to the backup order.

15. The computer-implemented method of claim 11, wherein a maximum capacity for the peer video data generated during a data collection time window is determined based on a predetermined data retention policy and a storage capacity of the backup storage device.

16. The computer-implemented method of claim 11, further comprising:
receiving a listing of camera identifiers of the first plurality of peer video cameras in a backup cluster from a server; and
determining, based on the listing, the backup storage device on the target peer video camera based on an order of the listing of camera identifiers in the backup cluster.

17. The computer-implemented method of claim 11, further comprising:
storing, by the first video camera, metadata about the received peer video data in a backup state log, wherein the metadata describes at least a size of the received peer video data and a camera identifier of a source peer video camera of the first plurality of peer video cameras.

18. The computer-implemented method of claim 17, further comprising:
determining a failed data retrieval event at the first video camera; and
initiating data recovery associated with the failed data retrieval event based on the backup state log.

19. The computer-implemented method of claim 11, further comprising, for each video camera in a camera group:
determining a backup target camera from the camera group based on the backup order; and
sending, to the backup target camera, captured video data by that video camera, wherein:
the camera group comprises the first plurality of peer video cameras and the first video camera;
the backup order comprises a sequential order of a plurality of unique identifiers; and
each unique identifier of the plurality of unique identifiers is associated with a corresponding video camera in the camera group.

20. A video camera, comprising:
at least one image sensor configured to capture video images;
a network interface configured for communication with a plurality of peer video cameras over a network, wherein at least one backup cluster of the plurality of peer video cameras is determined from a network topology based on the network;
a non-volatile memory configured to store source video data captured by the at least one image sensor;
means for receiving, over the network, peer video data from the plurality of peer video cameras;
means for storing the peer video data;
means for determining, based on a backup order of the plurality of peer video cameras and the video camera, a backup storage device located at a target peer video camera of the plurality of peer video cameras; and
means for sending the source video data to the backup storage device located at the target peer video camera of the plurality of peer video cameras according to the backup order.

* * * * *